(12) United States Patent
Green et al.

(10) Patent No.: US 10,720,011 B2
(45) Date of Patent: Jul. 21, 2020

(54) VIRTUAL GAMING SYSTEM BASED ON PREVIOUS SKILLS-BASED EVENTS

(71) Applicant: HIGHLIGHT GAMES LIMITED, London (GB)

(72) Inventors: Timothy Patrick Jonathan Green, Surrey (GB); Stewart James Whittle, Hertfordshire (GB); Angus Wood, London (GB); Chris Latter, London (GB)

(73) Assignee: Highlight Games Limited, London (GB)

( * ) Notice: Subject to any disclaimer, the term of this patent is extended or adjusted under 35 U.S.C. 154(b) by 0 days.

(21) Appl. No.: 16/418,390

(22) Filed: May 21, 2019

(65) Prior Publication Data

US 2019/0311576 A1 Oct. 10, 2019

Related U.S. Application Data

(63) Continuation-in-part of application No. 15/946,592, filed on Apr. 5, 2018, now Pat. No. 10,524,008.

(51) Int. Cl.
*G07F 17/32* (2006.01)

(52) U.S. Cl.
CPC ...... *G07F 17/3227* (2013.01); *G07F 17/3211* (2013.01); *G07F 17/3223* (2013.01); *G07F 17/3288* (2013.01)

(58) Field of Classification Search
CPC .. A63F 13/65; A63F 2300/8058; A63F 13/02; G07F 17/3211
See application file for complete search history.

(56) References Cited

U.S. PATENT DOCUMENTS

| | | | | |
|---|---|---|---|---|
| 6,166,744 | A * | 12/2000 | Jaszlics | G06T 17/00 345/421 |
| 6,616,529 | B1 * | 9/2003 | Qian | G07F 17/32 463/1 |
| 6,636,237 | B1 * | 10/2003 | Murray | G06F 3/0481 345/475 |
| 7,861,272 | B2 * | 12/2010 | Russ | H04L 29/06027 725/131 |
| 8,454,428 | B2 * | 6/2013 | Pacey | G07F 17/3288 463/22 |
| 2001/0016509 | A1 * | 8/2001 | Kusuda | G06Q 50/34 463/6 |

(Continued)

*Primary Examiner* — Reginald A Renwick
(74) *Attorney, Agent, or Firm* — Patent Ingenuity, P.C.; Samuel K. Simpson

(57) ABSTRACT

A system has a database that stores a plurality of pre-recorded video clips of real-world sports game events. Further, the system has a game engine processor that determines that a wager time period for a corresponding virtual sports game has completed. The game engine processor also determines an outcome of the virtual sports game subsequent to the determination that the wager time period has completed. Moreover, the game engine processor selects a pre-recoded clip from the plurality of pre-recorded clips that corresponds to the outcome. Finally, the game engine processor links the pre-recorded video clips as a base video layer to one or more overlay video layers. The wager time period is a period of time in which one or more user inputs are permitted to be received at a computing device that renders the virtual sports game.

20 Claims, 20 Drawing Sheets

(56) References Cited

U.S. PATENT DOCUMENTS

| | | | | |
|---|---|---|---|---|
| 2005/0044575 A1* | 2/2005 | Der Kuyl | ................ | G07F 17/32 |
| | | | | 725/100 |
| 2008/0070665 A1* | 3/2008 | Gatto | .................. | G07F 17/3211 |
| | | | | 463/16 |
| 2008/0227508 A1* | 9/2008 | Tomaru | ............... | G07F 17/3211 |
| | | | | 463/6 |
| 2008/0268930 A1* | 10/2008 | Miller | ..................... | A63F 13/10 |
| | | | | 463/6 |
| 2009/0054132 A1* | 2/2009 | Saito | .................. | G07F 17/3258 |
| | | | | 463/25 |
| 2009/0054133 A1* | 2/2009 | Saito | .................. | G07F 17/3211 |
| | | | | 463/25 |
| 2010/0271367 A1* | 10/2010 | Vaden | ..................... | A63F 13/65 |
| | | | | 345/420 |
| 2014/0087877 A1* | 3/2014 | Krishnan | .............. | A63F 13/525 |
| | | | | 463/33 |
| 2015/0174477 A1* | 6/2015 | Jackson | ................ | A63F 13/213 |
| | | | | 463/31 |

* cited by examiner

VIRTUAL GAMING SYSTEM BASED ON PREVIOUS SKILLS-BASED EVENTS

RELATED APPLICATIONS

This patent application is a Continuation-In-Part application of U.S. patent application Ser. No. 15/946,592, filed on Apr. 5, 2018, entitled VIRTUAL GAMING SYSTEM BASED ON PREVIOUS SKILLS-BASED EVENTS, which is hereby incorporated by reference in its entirety.

BACKGROUND

1. Field

This disclosure generally relates to the field of wager-based, computerized gaming systems. More particularly, the disclosure relates to a wager-based, virtual gaming system that operates a virtual game based on previous skill-based events.

2. General Background

Virtual sports ("VS") games typically allow users to place wagers on a fictitious sequence of sporting events rather than on live or future sporting events. For example, an animation of the fictitious sequence is typically generated and displayed on a display screen (e.g., television) so that a user may view, and place a wager on, the animated sequence.

Generating the aforementioned animated sequence is typically a quite resource-intensive process. For example, motion capture devices are utilized to capture the imagery for the animation; processors then have to analyze the captured data and compose the animated sequence. The memory requirements and processing capabilities necessary to generate a single animated sequence, let alone a variety of different animated sequences often necessary to pique user interest in playing a VS game, are quite significant.

Further, generating the animated sequence is labor-intensive and time-consuming as humans are typically involved in performing the movements that are captured by a motion capture apparatus. In other words, the functioning of computers, which generate animated sequences for VS games, is diminished by having to wait extended periods of time (e.g., days, weeks, months, etc.) for humans to perform the movements necessary as inputs for such computers to generate an animated sequence.

Accordingly, computerized configurations that generate animated sequences for VS games are so computationally resource-intensive and human resource-intensive that they are unable to perform in an optimal manner. As a result, conventional configurations for generating VS games based on animated sequences are typically not scalable enough for mass deployment.

SUMMARY

A system has a database that stores a plurality of audio/visual ("A/V") clips. Further, the system has a memory device that has a buffer with a threshold quantity of memory blocks.

In addition, the system has a processor that receives the plurality of A/V clips in an ordered sequence for a virtual sports game. The processor also writes one or more frames of a first A/V clip to the buffer. Further, the processor allocates the threshold quantity of memory blocks such that the processing speed of writing one or more frames of a second A/V clip to the buffer is faster than a broadcast frame rate for broadcasting the first A/V clip. In addition, the processor writes the one or more frames of the second A/V clip to the allocated threshold quantity of memory blocks of the buffer. Also, the processor reads, at the broadcast frame rate, the one or more frames of the first A/V clip from the buffer and the one or more frames of the second A/V clip from the buffer. The processor sends, at the broadcast frame rate, a gapless set of content to a playback device. The gapless set of content has the one or more video frames of the first A/V clip and the one or more video frames of the second A/V clip. Each of the plurality of A/V clips corresponds to a sports-based event occurring prior to initiation of the virtual sports game at a computing device.

Alternatively, a computer program may have a computer readable storage device with a computer readable program stored thereon that implements the functionality of the aforementioned system. As yet another alternative, a process that utilizes a processor may implement the functionality of the aforementioned system.

In another embodiment, a system has a database that stores a plurality of pre-recorded video clips of real-world sports game events. Further, the system has a game engine processor that determines that a wager time period for a corresponding virtual sports game has completed. The game engine processor also determines an outcome of the virtual sports game subsequent to the determination that the wager time period has completed. Moreover, the game engine processor selects a pre-recoded clip from the plurality of pre-recorded clips that corresponds to the outcome. Finally, the game engine processor links the pre-recorded video clips as a base video layer to one or more overlay video layers. The wager time period is a period of time in which one or more user inputs are permitted to be received at a computing device that renders the virtual sports game. The one or more overlay video layers have one or more images that correspond to one or more virtual sports game criteria. Additionally, the one or more virtual sports game criteria differ from video content corresponding to the real-world sports game event.

Alternatively, a computer program may have a computer readable storage device with a computer readable program stored thereon that implements the functionality of the aforementioned system. As yet another alternative, a process that utilizes a processor may implement the functionality of the aforementioned system.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A virtual gaming system based on previous skill-based events is provided. Rather than generating an animation of fictitious events, which is computationally-intensive and labor-intensive, the virtual gaming system selects pre-recorded, or pre-captured, content to generate a fictitious sequence of events on which users may place a wager; thereby obviating utilization of inefficient technologies such as motion capture.

Further, the virtual gaming system improves upon the functioning of computers utilized to provide VS games with technologies other than motion capture. For instance, if pre-recorded data such as video clips was sent to a computer, those video clips would have typically been streamed simultaneously to the computer for playback with gaps between the video clips rather than the gapless playback performed by the virtual gaming system. Instead of having memory requirements for simultaneously receiving streamed video clips, the virtual gaming system obtains gapless playback by decoding frames in a pipeline. Through utilization of a buffer in a memory device, the virtual gaming system improves the functioning of a computer for non-animated sequences by reducing memory requirements.

Figure 1A:
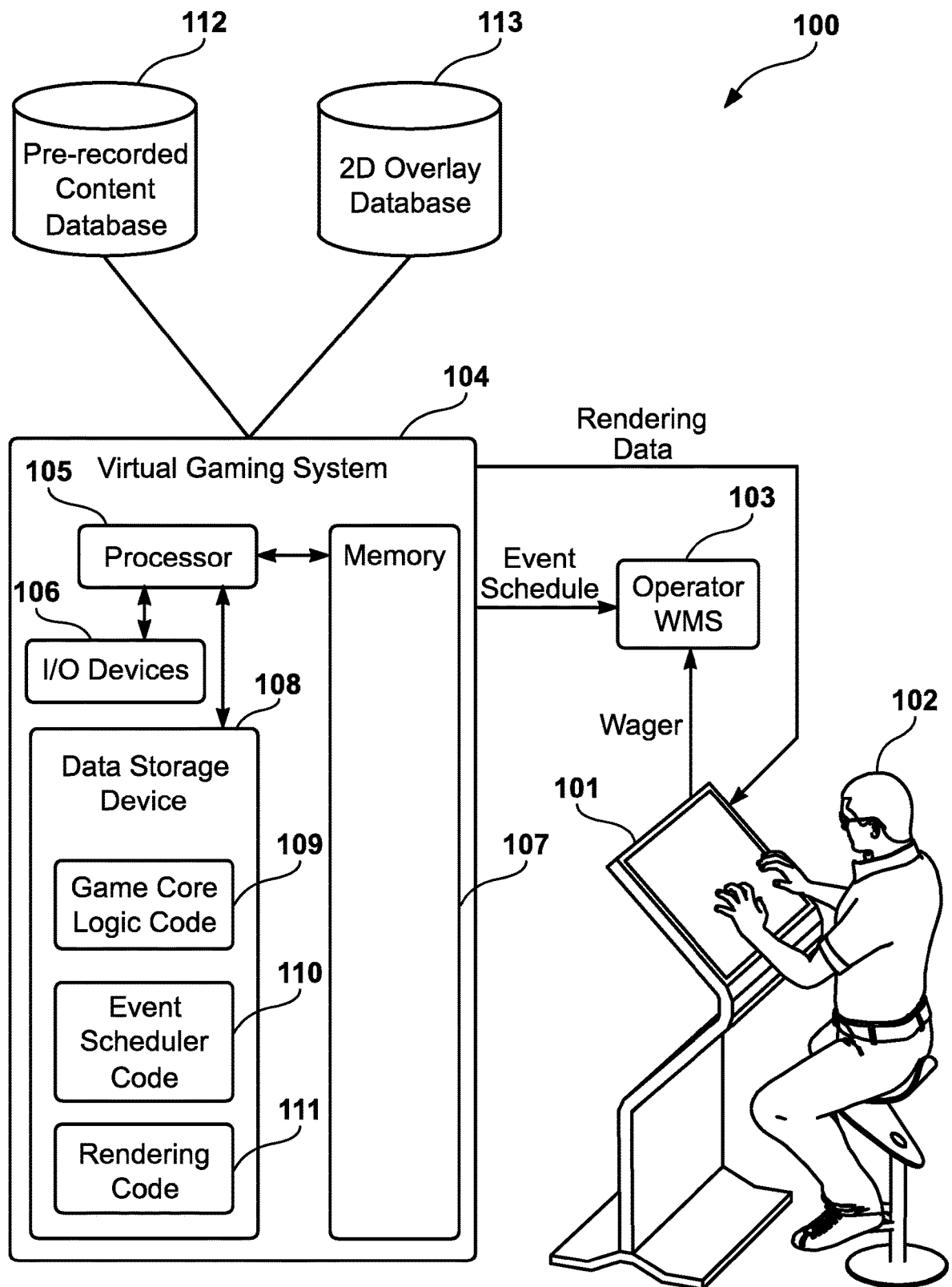
FIG. 1A illustrates a virtual game configuration that operates a virtual game in which a user may place a wager from a virtual game console.

FIG. 1A illustrates a virtual game configuration 100 that operates a virtual game in which a user 102 may place a wager from a virtual game console 101. In one embodiment, the virtual game console 101 receives inputs from the user 102 (e.g., via touch screen inputs, button activations, hand gestures, etc.) and displays content associated with operation of the virtual game (e.g., via an integrated display screen). In another embodiment, the virtual game console 101 receives inputs from the user 102, but the content associated with operation of the virtual game is displayed by, or projected onto, a display screen that is distinct from the virtual game console 101. (The projection referred to herein is not limited to operation on a flat screen, or two-dimensional projection, as three-dimensional projection (e.g., via holographic projector) may be alternatively utilized to project the associated content.)

An operator wager management system ("WMS") 103 receives the wager from the virtual game console 101 (e.g., via a computerized network, telecommunications network, wired network, etc.). After receiving the wager, the operator WMS 103 awaits an outcome of the virtual game so that the operator WMS 103 may determine what prize, if any, is won by the user 102 and/or additional users. In other words, the operator WMS 103 is associated with a gaming entity (e.g., casino, lottery, etc.) whose responsibilities include, but are not limited to, receiving wagers and distributing prizes.

The virtual gaming configuration 100 also includes a virtual gaming system 104 that schedules a virtual game and generates content to be displayed during the virtual game. Included as componentry within the virtual gaming system 104 are a processor 105, various input/output ("I/O") devices 106, a memory device 107, and a data storage device 108.

The processor 105 executes various code within the memory device 107. For instance, the processor 105 retrieves game core logic code 109, event scheduler code 110, and rendering code 111 from the data storage device 108 for operation in the memory 107.

In particular, the game core logic code 109 allows the processor 105 to operate the virtual game. For example, the game core logic code 109 may have a rules-based approach that randomly selects content associated with the virtual game for display during the virtual game. Accordingly, the game core logic code 109 may require that random data be obtained from a certified random source (e.g., a particular random number generator ("RNG")).

Further, the event scheduler code 110 allows the processor 105 to schedule events for operation of the virtual game. For example, the event scheduler code 110 may indicate that the virtual game is scheduled to be played every twenty minutes. (Other time intervals, specific times, etc. may be utilized instead.) The schedule of such time increments may be sent by the processor 105 executing the event scheduler code 110 according to a different time interval (e.g., daily transmission of schedule for virtual game operated at twenty minute intervals).

Also, the event scheduler code 110 allows the processor 105 to inform the operator WMS 103 that wagering is opened or closed for a particular iteration of the virtual game. Accordingly, the operator WMS 103 may receive wagers prior to and/or during the virtual game based on whether or not wagering is allowed at a given time, as determined by the processor 105 when executing the event scheduler code 110. The processor 105 may also send event results, as determined via execution of the event scheduler code 110, to the operator WMS 103.

The communications between the virtual gaming system 104, or any componentry thereof, and the operator WMS 103 may be performed through a network (computerized, telecommunications, wired, etc.).

In addition to operating and scheduling the virtual game, the processor 105 may execute the rendering code 111 to select content for display during operation of the virtual game. The virtual gaming system 104 is in operable communication with a pre-recorded content database 112, which may store pre-recorded video clips of skill-based events occurring prior to initiation of the virtual game, and a 2D overlay database, which may store various data that may be appended to the pre-recorded video clips. After the processor 105 determines an outcome of the virtual game, via execution of the game core logic code 109 (e.g., according to an RNG), the processor 105 may determine from the game core logic code 109 that the rendering code 111 is to be executed to compose rendering data for playback of the selected video clips and corresponding 2D overlay data. The processor 105 may send the rendering data through a network (computerized, telecommunications, wired, etc.) to the virtual gaming console 101 for display at the virtual gaming console 101. Alternatively, the processor 105 may send the rendering data to the operator WMS 103, which then sends the rendering data to the virtual gaming console 101.

Although the virtual gaming system 104 is depicted as being distinct from the virtual gaming console 101, the virtual gaming system 104, or componentry thereof, may be integrated within the virtual gaming console 101 in an alternative configuration. As a result, each virtual gaming console 101 may schedule an iteration of a virtual game specific to that particular virtual gaming console 101 rather than relying on a centralized server. Further, the rendering data may be provided directly, without a network, to a display screen of the virtual gaming console 101 in such an alternative configuration.

Figure 1B:
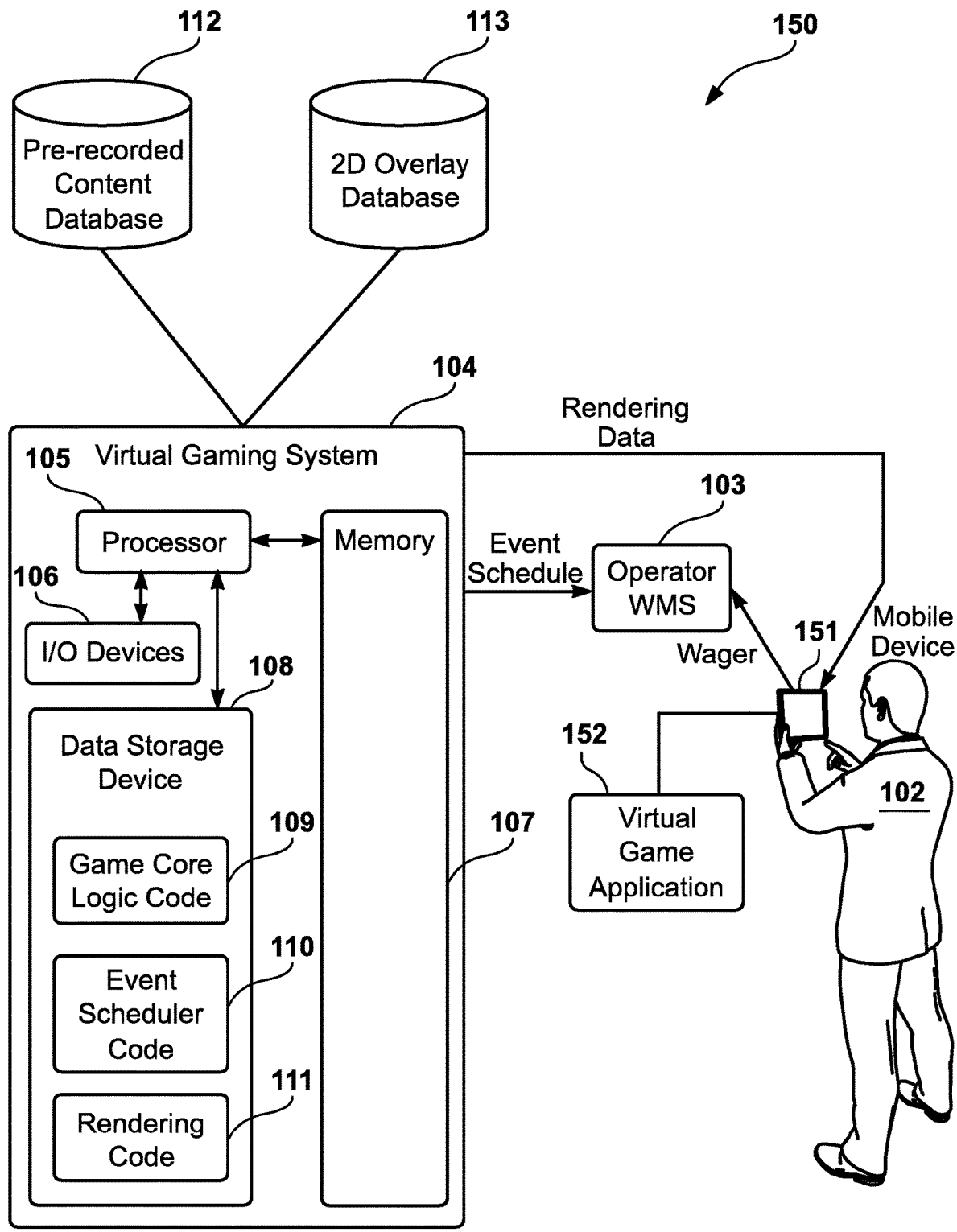
FIG. 1B illustrates a virtual game configuration that is an alternative to the virtual game configuration illustrated in FIG. 1A.

FIG. 1B illustrates a virtual game configuration 150 that is an alternative to the virtual game configuration 100 illustrated in FIG. 1A. Rather than allowing the virtual game console 101 to place a wager, the virtual game configuration 150 allows the user 102 to user a virtual game application 152 to operate the virtual game from a mobile computing device (e.g., smartphone, laptop, tablet device, smartwatch, smart wearable, etc.). In one embodiment, the mobile computing device 151 is utilized by the user 102 to send a wager to the operator WMS 103 and receive rendering data for display at the mobile computing device 151. In an alternative embodiment, the mobile computing device 151 is utilized by the user 102 to send the wager to the operator WMS 103, but the virtual gaming system 104 sends the rendering data to a display device (e.g., television) that is distinct from the mobile computing device 151.

Figure 2:
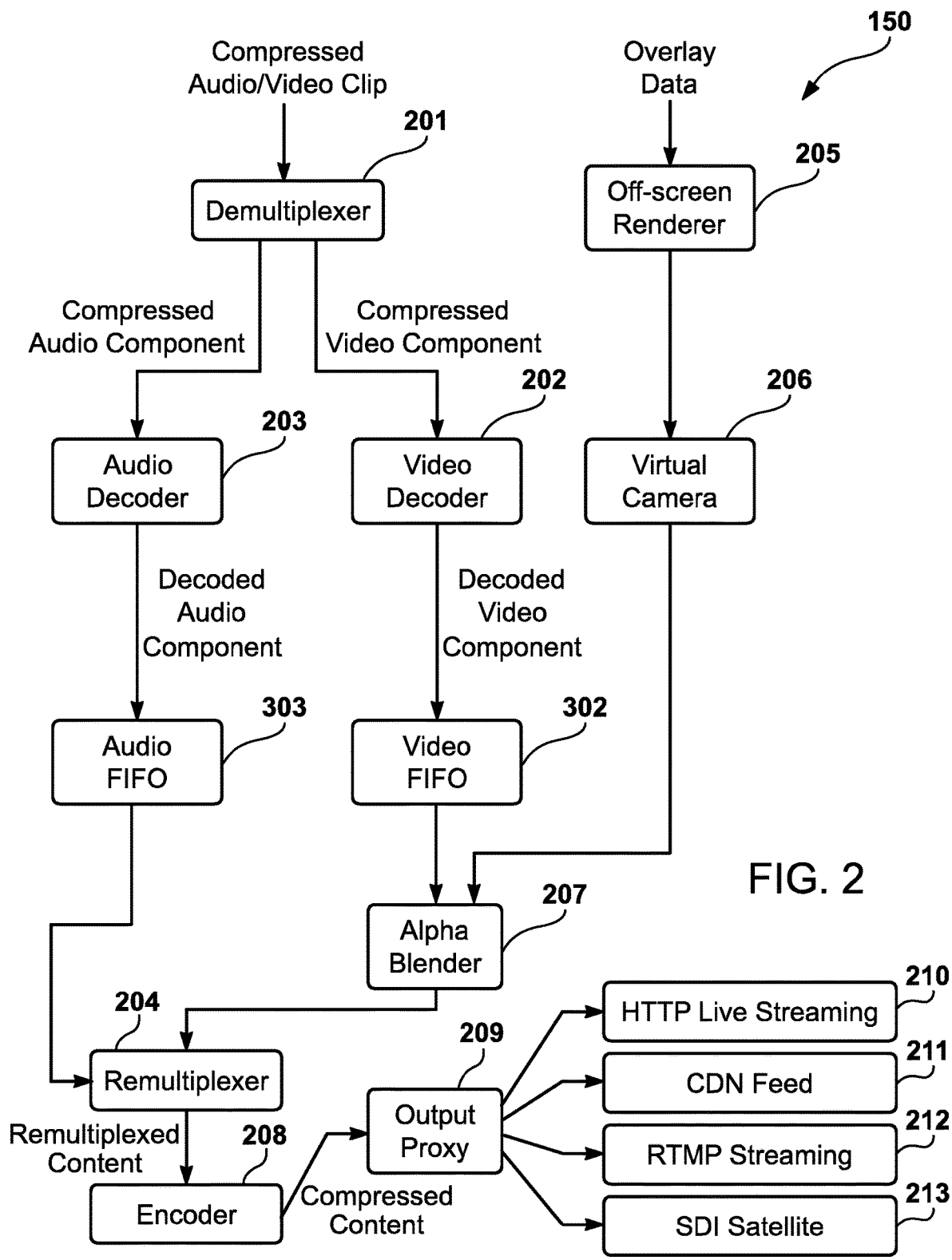
FIG. 2 illustrates componentry of the rendering code illustrated in FIGS. 1A and 1B.

FIG. 2 illustrates componentry of the rendering code 111 illustrated in FIGS. 1A and 1B. The processor 105 (FIGS. 1A and 1B), when executing the game core logic code 109 and/or the rendering code 111, receives a plurality of compressed video clips from the pre-recorded content database 112; those clips may include video and/or audio content. In one embodiment, the processor 105, when executing the rendering code 111, may compose a queue of video clips (e.g., in the order received). The processor 105 may then execute the rendering code 111 to compose the rendering data based on each video clip in turn.

For instance, a compressed video clip that is at the front of the queue may be provided by the processor 105 to a demultiplexer 201, which demultiplexes the compressed video clip into its compressed video components and compressed audio components. The processor 105 provides the compressed audio component to an audio decoder 203, which decodes the compressed audio component into its uncompressed audio format, and the compressed video component to a video decoder 202, which decodes the compressed video component into its uncompressed video format.

In one embodiment, the uncompressed video component is added to a first-in, first-out ("FIFO") video queue, and the audio component is added to a FIFO audio queue that is distinct from the FIFO video queue. (The FIFO queues may be stored in the memory device 107, the data storage device 108, or another non-transitory computer readable storage device.) Whereas the current decoded video component outputted from the FIFO video queues is processed via the processor 105 executing the rendering code 111, the current decoded audio component, as determined by first positioning in the FIFO audio queue, is not processed until the processing of the decoded video component has completed.

In other words, an audio/video clip is decomposed into its respective audio and video components (e.g., frames) to isolate the video component for processing individually from the audio component. After enhancing the video component, the processor 105 may execute the rendering code 111 to utilize a re-multiplexer 204 to recompose an audio/video clip with the original audio component and the enhanced video component.

As the end of a video component is about to be read by the processor 105, the rendering code 111 retrieves the next video component from the FIFO video queue. Accordingly, the FIFO video queue allows for enough buffering so that uncompressed video frames being subsequently read by the processor 105 are not completely consumed before the video decoder 202 begins decoding uncompressed video frames of the next A/V clip.

Figure 3:
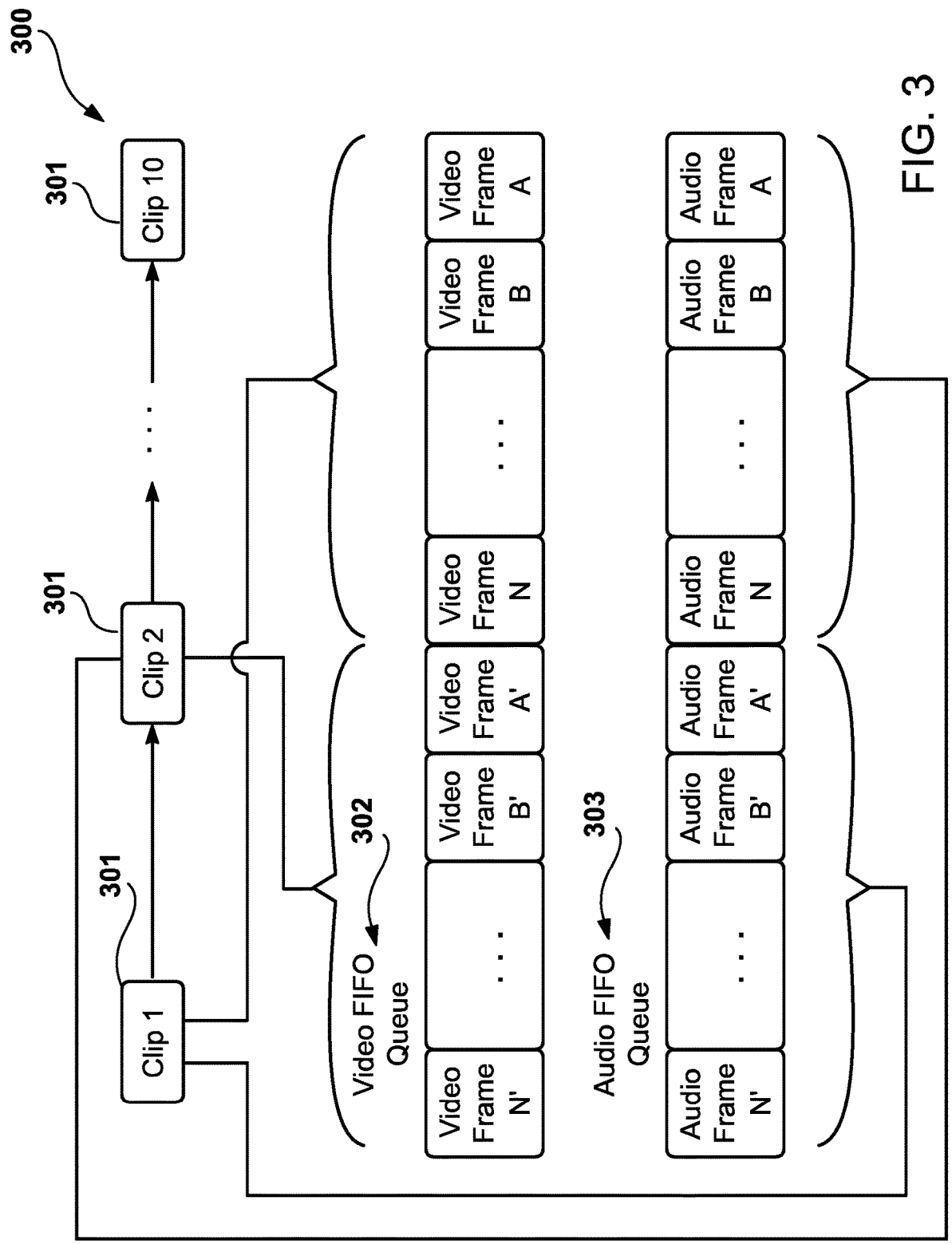
FIG. 3 illustrates an example of a pipeline that is utilized to process content for a VS game based on a series of previous skill-based events.

FIG. 3 illustrates an example of a pipeline 300 that is utilized to process content for a VS game based on a series of previous skill-based events. For instance, a plurality of A/V clips 301, each corresponding to a previous skill-based event occurring prior to initiation of the VS game, may be played back-to-back in a certain order for the VS game. Audio and video FIFOs are generated for each of the A/V clips 301. As an example, a video FIFO queue 302 for a first clip 301 has video frame A in the first position since video frame A is the first frame of the first clip 301, and an audio FIFO queue 303 for the first clip 301 has the audio frame A in the first position since audio frame A is the first frame of the first clip 301. Prior to decoding the last video frame N in the video FIFO queue 302, the processor 105 (FIGS. 1A and 1B) executes the rendering code 111 to ensure that enough of a buffer is present in the memory device 107 to allow the video decoder 202 (FIG. 2) to write decompressed video frames from a second clip 301 to the memory device 107. For instance, as the video decoder 202 is about to decode a last video frame N from the first video FIFO queue 302, the processor 105 executes, or previously executed, the rendering code 111 to free up memory that was previously occupied by video frames A through N of the first video FIFO queue 302; as a result, the memory device 107 has enough of a buffer for video frame A' of a second video FIFO queue 304. A threshold quantity of memory blocks may be allocated to the memory device 107 to write the video frame A' to the buffer faster than the broadcast frame rate (e.g., twenty five frames per second for high-definition content) of the video frame N. Therefore, playback appears to the user 102 (FIG. 1A) or the user 152 (FIG. 1B) as being gapless (e.g., no gap appears between the first clips 301 and the second clip 301 during playback).

By performing effective memory management, the processor 105 reduces memory requirements to improve the functioning of a computer. As A/V clips may exhaust large quantities of memory, conventional, simultaneous storage of A/V clips is ineffective for VS games (i.e., gaps between clips would result as too much memory from a current clip would consume memory necessary for a next clip). The pipeline 300 A/Voids the necessity of such significant memory requirements by managing memory according to FIFO on a per-clip basis to ensure adequate buffering for gapless playback of a series of video clips. Further, the pipeline 300 implementing such effective memory management allows for gapless playback to be rendered at the virtual gaming console 101 (FIG. 1A) or the mobile computing device 151 (FIG. 1B)—even without extra memory and/or software at the virtual gaming console 101 or the mobile computing device 151. In addition, the pipeline 300 may be implemented on a server, with or without a graphics card.

Returning to FIG. 2, the processor 105 executes the rendering code 111 to not only render a series of video clips, but also overlay data that enhances the video clips. The video clips may display a plurality of skill-based events as previously recorded (e.g., a plurality of soccer matches, football games, etc.); yet, such clips may alone not depict data directly related to an outcome of the VS game from the perspective of the user 102 (FIGS. 1A and 1B). For instance, a VS game score, which depends on the outcomes of a plurality of different events, is not displayed by the clips themselves.

Accordingly, in addition to receiving a compressed A/V clip, the processor 105 (FIGS. 1A and 1B) may also receive overlay data to be rendered in conjunction with a corresponding A/V clip. In one embodiment, the overlay data, which may be pertinent to the VS game and/or the events associated with the A/V clips themselves, are dynamic—changing throughout the VS game to pique the interest of the user 102 (FIGS. 1A and 1B). For example, the overlay data may include changing data such as team names, event location, etc. as the VS game seamlessly advances from one clip to the next. In an alternative embodiment, the overlay data is constant—persisting through at least a substantial portion, or possibly the entirety, of the VS game. For example, the overlay data may include a color scheme associated with a team that appears in all, or a substantial portion, of the video clips.

The rendering code 111 may include an off-screen renderer 205 that renders the overlay data not present in the on-screen rendering of the plurality of clips 301 illustrated in FIG. 3. In one embodiment, the off-screen render 205 utilizes web browser code (e.g., HTML5) to generate a layout, and perform rendering, of the overlay data in conjunction with the plurality of video clips 301. For example, the off-screen renderer 205 may be an HTML5 renderer that instantiates a browser window in the memory device 107 (FIGS. 1A and 1B). A webpage appearing in the browser window may have transparent, or translucent, foreground and background elements by controlling an alpha variable. Accordingly, the background, foreground, or elements placed within either may have varying degrees of transparence or translucence. (In addition to conventional red, green, and blue ("RGB") values, the alpha value is specific to transparency.) As an example, a webpage with an alpha value of zero will be fully transparent.

The browser window generated by the off-screen renderer 205 may be updated to display the overlay data and a transparent portion for the remaining area of the browser window intended for the portion of the video clip over which no overlay data is intended to be present. In other words, the browser window may be updated to perform synchronized rendering of particular overlay data in conjunction with playback of a corresponding video frame of one of the A/V clips 301 illustrated in FIG. 3. Updates to the web browser window may be recorded as data blocks of blue, green, red, and alpha ("BGRA") pixels in the memory device 107 (FIGS. 1A and 1B).

Further, in one embodiment, the array of BGRA pixels is represented as a video camera feed. For instance, a virtual camera 206 may be configured to represent itself as a camera device to the operating system (e.g., via a device driver, native communications with the operating system, etc.). A plurality of variables (e.g., width, height, pixel format, color depth, etc.) may be associated with the virtual camera 206. After being initialized, the virtual camera may receive the overlay data as HTML5, or other browser code, frames. In other words, the off-screen renderer 205 renders a web browser that is a camera feed for the virtual camera 206.

Figure 4:
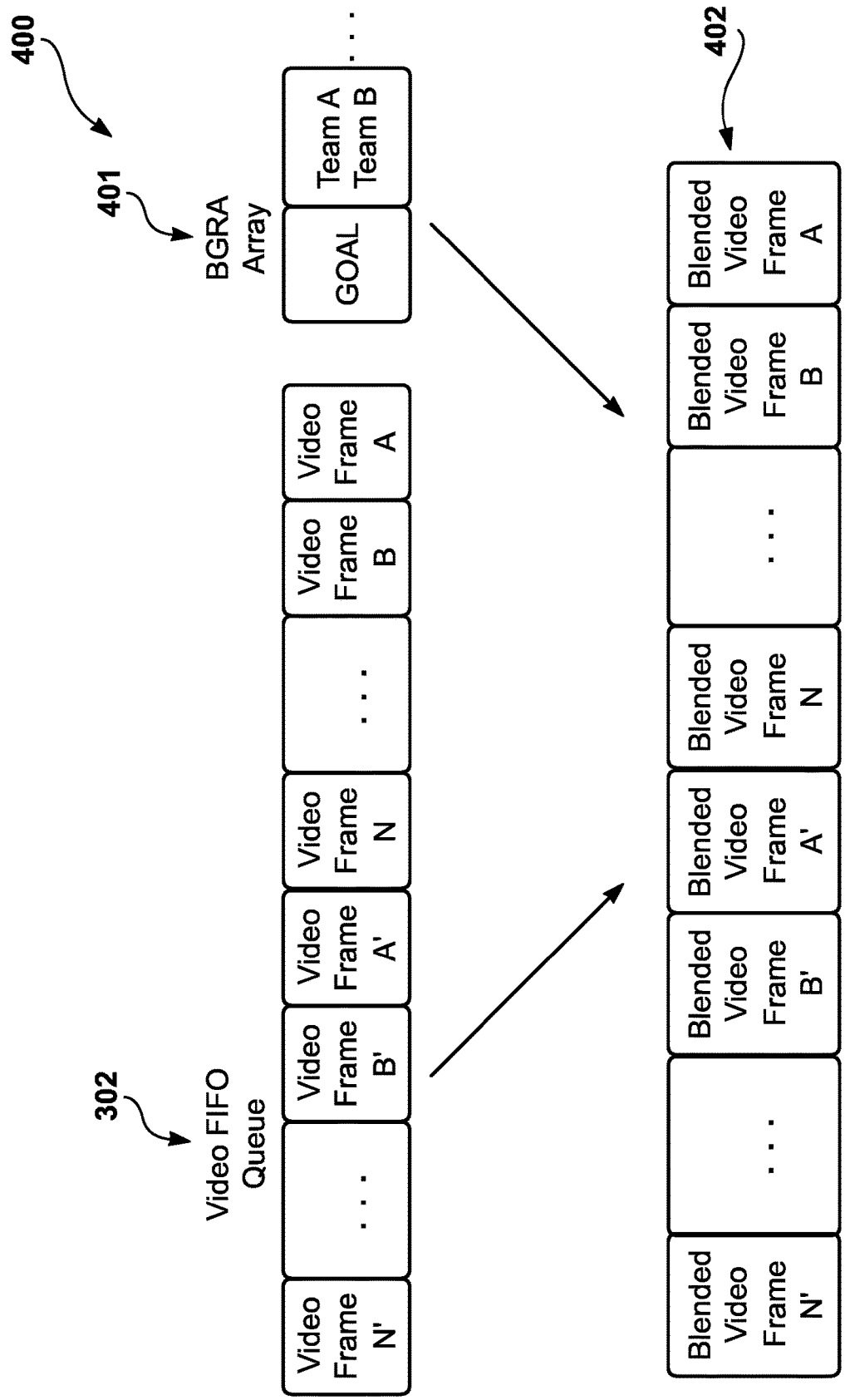
FIG. 4 illustrates a blending configuration.

After isolating the decompressed video frames from the plurality of A/V clips 301 into FIFO queues and capturing overlay data via the virtual camera 206, the processor 105 (FIGS. 1A and 1B) executes the rendering code 111 to invoke an alpha blender 207 to blend the overlay data captured by the virtual camera 206 over the video frames from the video FIFO queue 302 (FIG. 3). As illustrated by a blending configuration 400 in FIG. 4, the processor 105 (FIGS. 1A and 1B) reads data at a synchronized frame rate (e.g., a broadcast frame rate for playback) from the video FIFO 302 and a BGRA array of pixels 401. As a result, the processor 105 (FIGS. 1A and 1B) generates a blended video FIFO queue 402 in which the HTML5 camera pixels are alpha blended onto the FIFO video frames.

Returning once again to FIG. 2, the alpha blender 207 may blend video frames with overlay data in a synchronized manner utilizing a variety of different approaches. For example, the processor 105 may output the decompressed video frames 301 into a different type of data structure other than a FIFO-based data structure or may render the overlay data via a configuration other than a web browser-based system.

In one embodiment, after the alpha blending is performed by the alpha blender 207, the processor 105 (FIGS. 1A and 1B) executes the rendering code 111 to invoke a re-multiplexer 204 that re-multiplexes the de-multiplexed audio with the de-multiplexed, yet enhanced, video. The processor 105 executes the rendering code 111 to read the enhanced video frames from the alpha blender 207, or the memory device 107, and the audio from the audio FIFO queue 303. Further, the processor 105 executes the rendering code 111 to invoke an encoder 208 (e.g., MPEG encoder) to encode the re-multiplexed content into a compressed format that may be broadcasted to the user 102 (FIGS. 1A and 1B).

Accordingly, the processor 105 may execute the rendering code 111 to invoke an output proxy 209 that receives the compressed content encoded by the encoder 208 (e.g., at a broadcast frame rate) and sends the compressed content to the user 102 (e.g., at the broadcast frame rate) via one or more output systems (e.g., HTTP live streaming 210, a streaming format 211 sent to a content distribution network ("CDN") for distribution to the user 102, a streaming format 212 such as Real-Time Messaging Protocol ("RTMP") sent to a streaming service, a direct link to a Serial Digital Interface ("SDI") feed 213 for satellite broadcast, local playback, a file writing service that saves video clips for subsequent broadcast, etc.).

In addition to the componentry illustrated in FIG. 2, various other components may be utilized to supplement the rendering of a VS game. For instance, prior to the processor 105 executing the rendering code 111 to re-multiplex the alpha-blended video with the original audio, the processor 105 may also invoke a picture-in-picture blender to blend overlay data as windows that are relatively small to a main window depicting the video frames of the original content. Such picture-in-picture windows may be specifically resized video clips or video clip files that are dynamically resized as necessary. In one embodiment, the picture-in-picture rendering is performed without alpha transparency (i.e., the pixels from the smaller video completely overwrite the background pixels of the larger video).

In another embodiment, audio may be obtained from a third-party source (e.g., a live commentary of a virtual event such as the VS game). In other words, audio in addition to the audio that is broadcasted from the original event may be utilized with any rendering pipeline described herein.

Figure 5A:
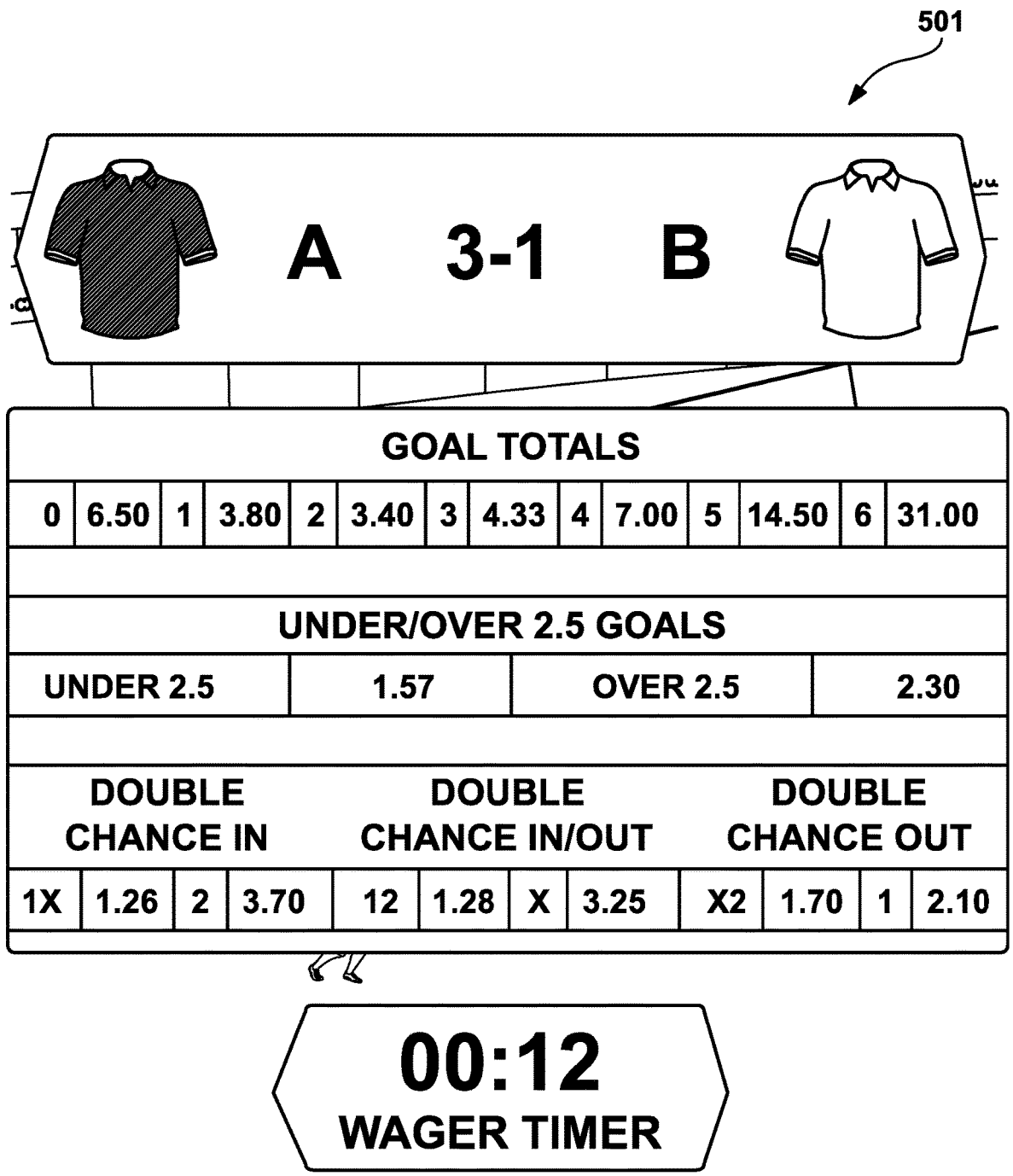
FIG. 5A illustrates an introductory screen that may be appended to the beginning of a sequence of A/V clips or overlaid on a particular A/V clip.

FIGS. 5A-5J illustrate examples of renderings generated by the processor 105 executing the rendering code 111 illustrated in the virtual game configuration 100 of FIGS. 1A and 1B. FIG. 5A illustrates an introductory screen 501 that may be appended to the beginning of a sequence of A/V clips 301 (FIG. 3) or overlaid on a particular A/V clip 301. The introductory screen 501 may include the names of participating teams (e.g., A and B), odds for various wagers, a timer for placing a wager in the VS game, etc. In other words, the introductory screen 501 displays data pertinent to the group of selected A/V clips for the VS game (e.g., odds for a total score in all of the selected clips) rather than data that just pertains solely to any one clip.

Figure 5B:
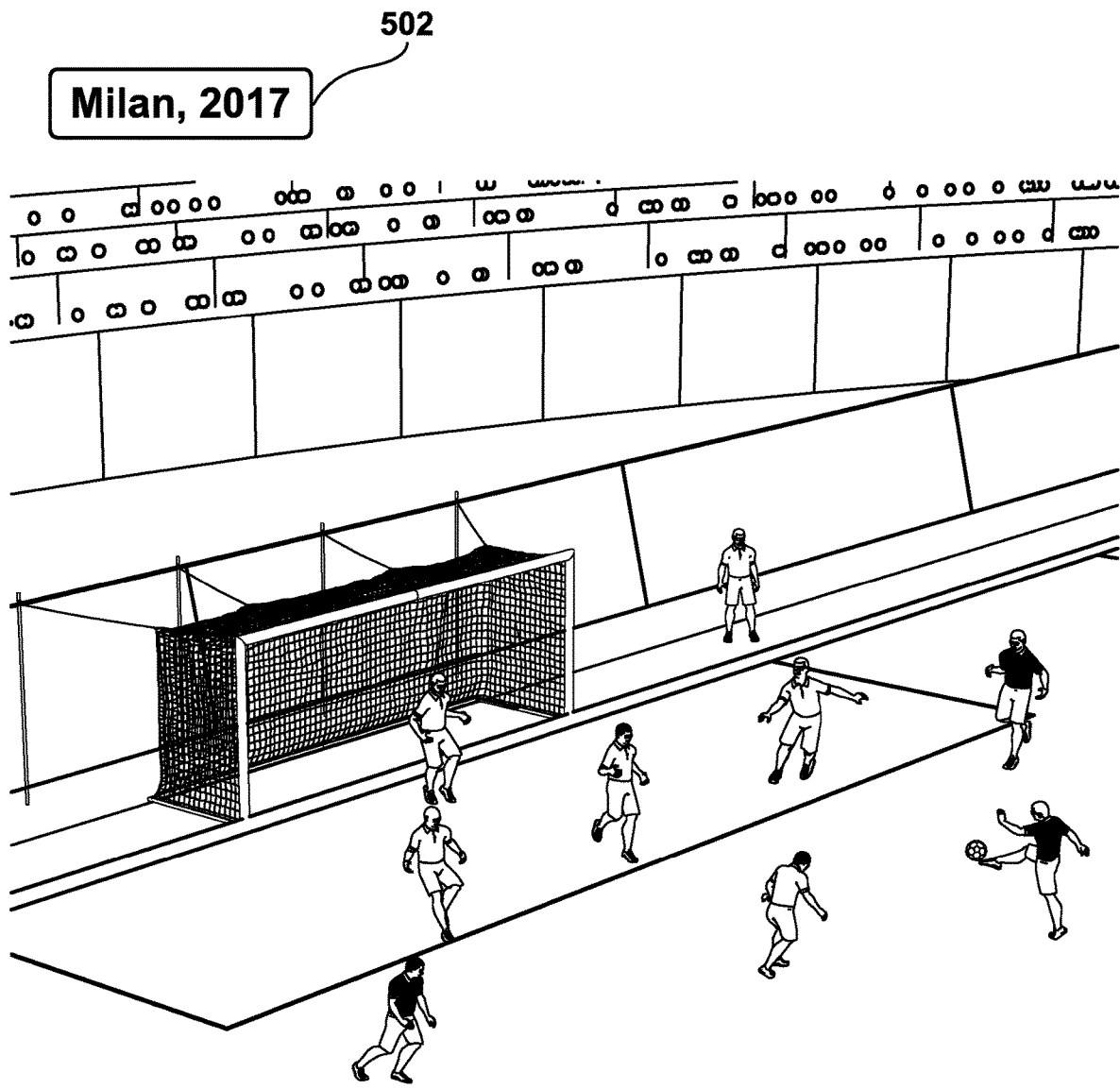
FIG. 5B illustrates a snapshot of a pre-recorded soccer game.
Figure 5C:
FIG. 5C illustrates a subsequent snapshot of the soccer game from the same A/V clip in which the kicked ball reaches the goal to score one point for team A.

FIG. 5B illustrates a snapshot of a pre-recorded soccer game. A data box 502 is overlaid onto the pre-recorded soccer game to depict the location and year of this particular A/V clip. Further, a data box 503 is overlaid onto the pre-recorded soccer game to depict the team names and respective scores in the VS game. For example, the score in the VS game is currently zero-zero, which may be quite different than the score for that soccer game at that juncture. However, one of the soccer players is kicking the soccer ball. FIG. 5C illustrates a subsequent snapshot of the soccer game from the same A/V clip 301 (FIG. 3) in which the kicked ball reaches the goal to score one point for team A. The data box 503 is updated to reflect the score of the VS game having one goal for team A. Further, text 504 stating "GOAL" is overlaid onto the pre-recorded soccer game.

Figure 5D:
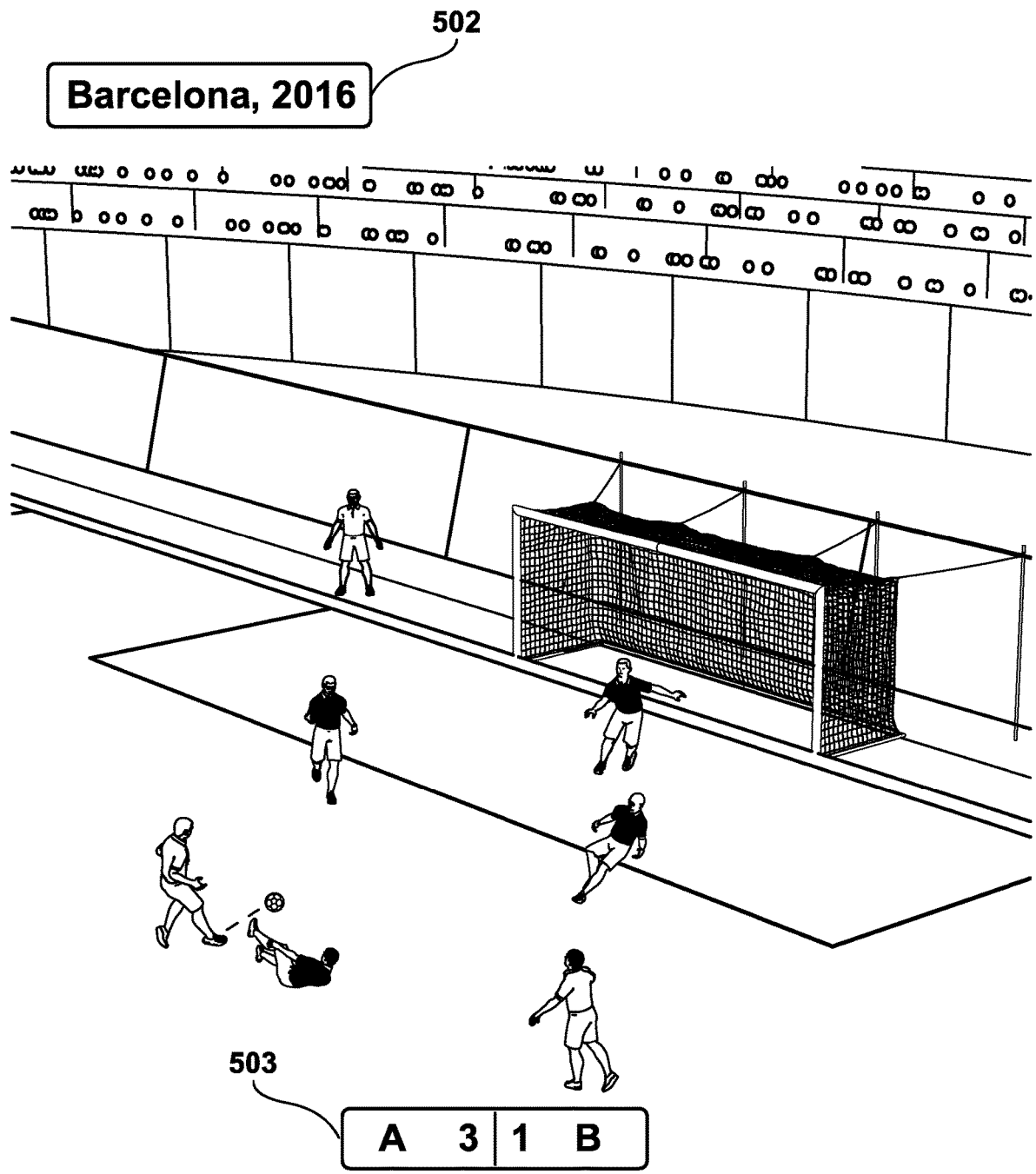
FIG. 5D illustrates a snapshot of a second A/V clip that is selected to be rendered after the A/V clip illustrated in FIGS. 5B and 5C.
Figure 5E:
FIG. 5E illustrates that the player missed the goal.

FIG. 5D illustrates a snapshot of a second A/V clip 301 (FIG. 3) that is selected to be rendered after the A/V clip 301 illustrated in FIGS. 5B and 5C. The data box 502 is updated to reflect a change in the location and year of the actual soccer game. One of the soccer players is depicted in an attempt to score a goal. FIG. 5E illustrates that the player missed the goal. Accordingly, text 505 stating "MISS" is overlaid onto the pre-recorded soccer game.

Figure 5F:
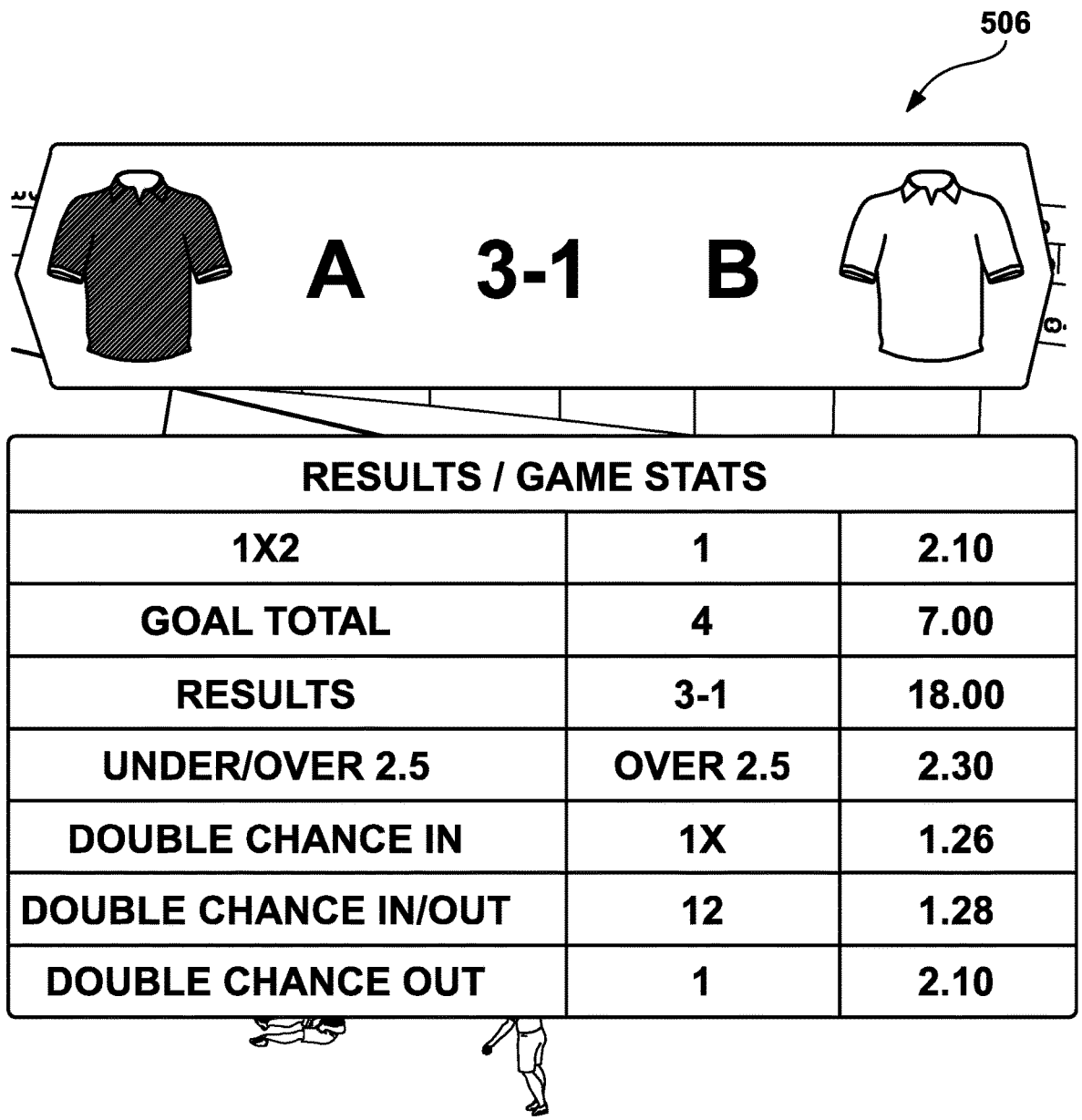
FIG. 5F illustrates a results screen that may be appended to the end of a sequence of A/V clips or overlaid on a particular A/V clip.

FIG. 5F illustrates a results screen 506 that may be appended to the end of a sequence of A/V clips 301 (FIG. 3) or overlaid on a particular A/V clip 301. The results screen 506 may include game statistics, goal totals, etc. Therefore, the player 102 (FIGS. 1A and 1B) of the VS game is able to view the results of the VS game.

Figure 5G:
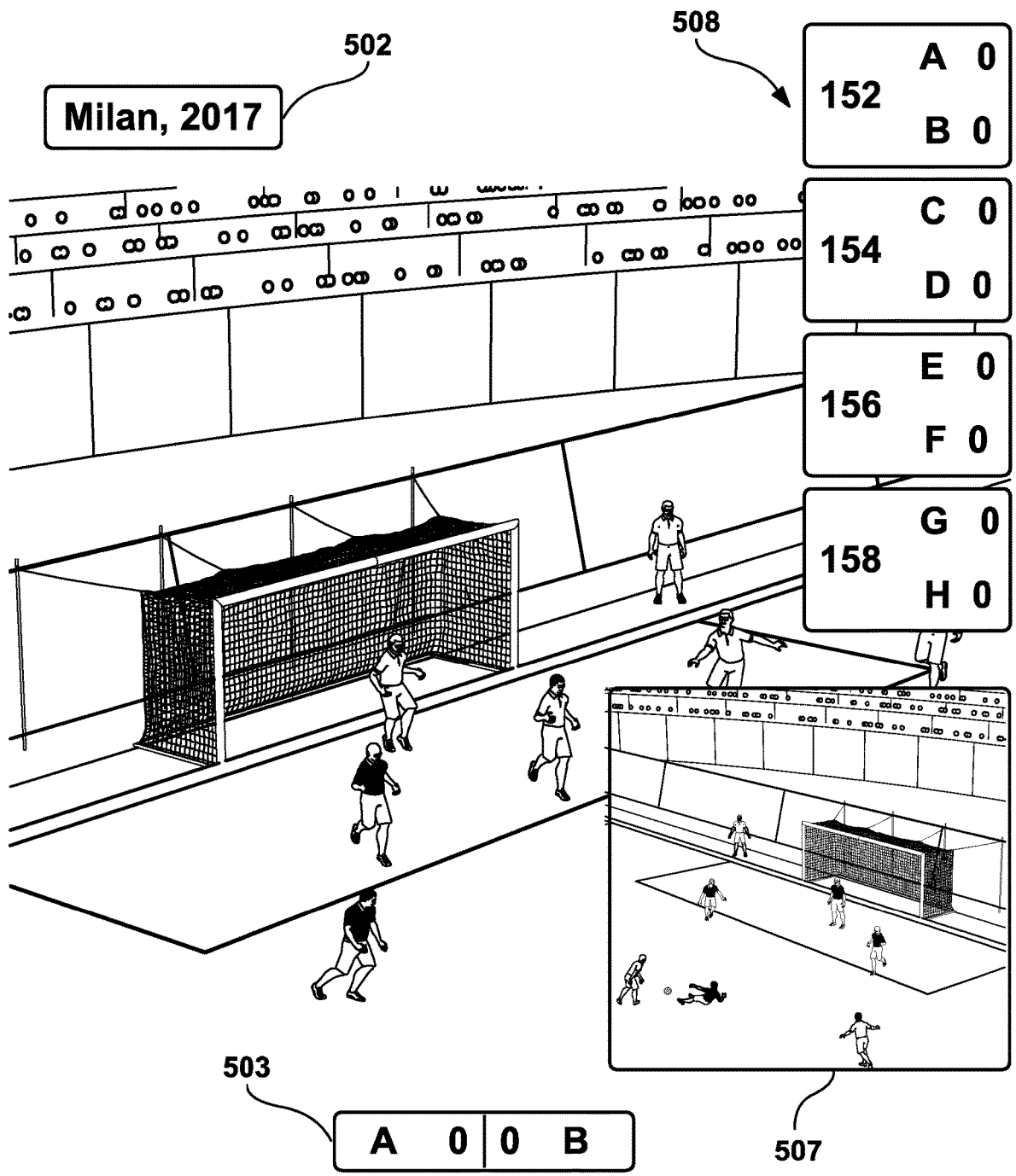
FIG. 5G illustrates a snapshot of a pre-recorded soccer game with a picture-in-picture display for other previously recorded soccer games.
Figure 5H:
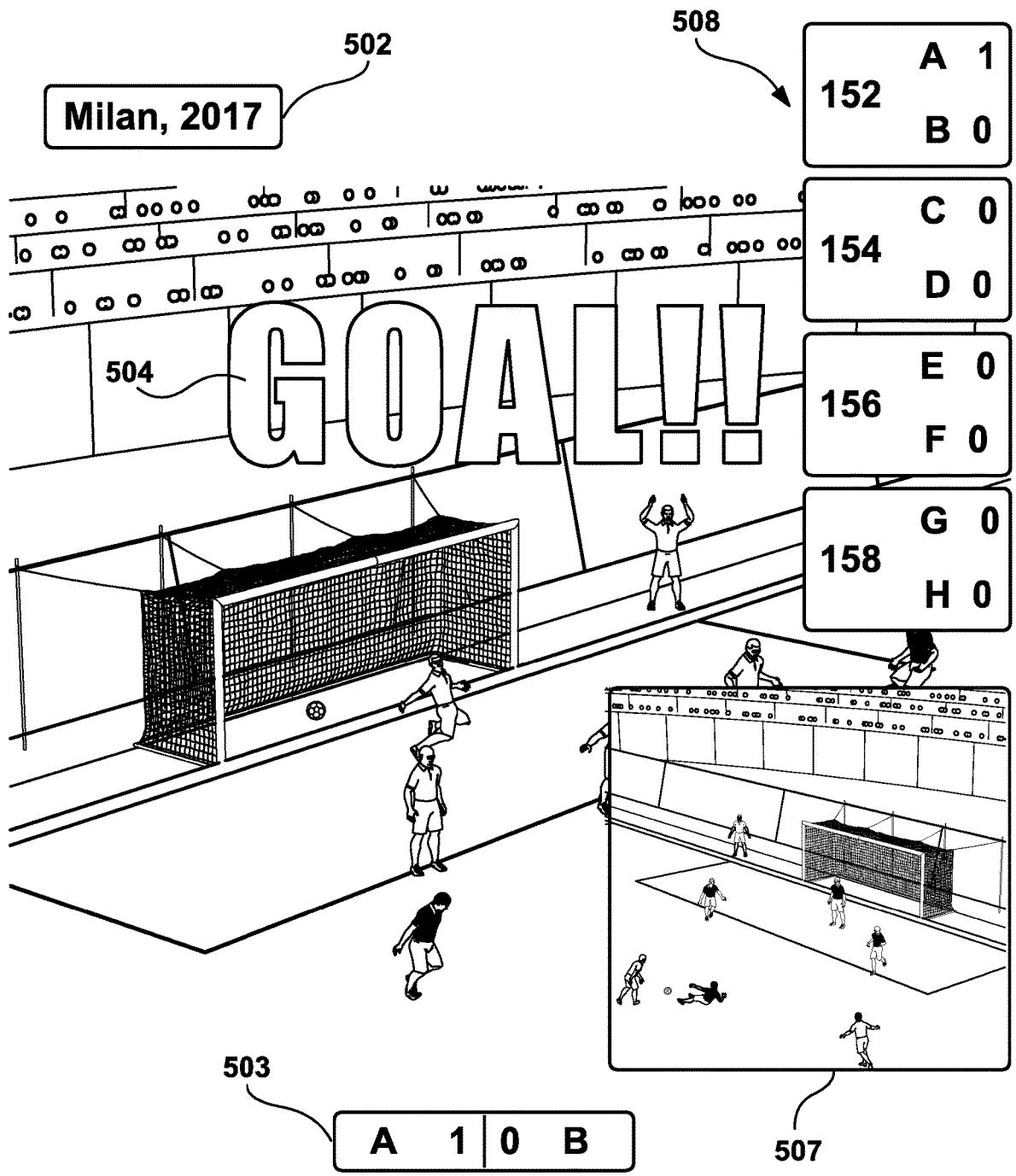
FIG. 5H illustrates the text stating "GOAL" for a goal scored in the main screen.

In an alternative embodiment, a picture-in-picture display may be utilized to display one or more additional skill-based events. For example, the VS game may be based on a wager for multiple previously-recorded soccer games. FIG. 5G illustrates a snapshot of a pre-recorded soccer game with a picture-in-picture display 507 for other previously recorded soccer games. A panel 508 may be displayed in one portion (e.g., right side) of the screen to illustrate the scores of all, or some of, the soccer games. Further, the panel may be highlighted to indicate which game being displayed in the main screen or in the picture-in-picture display 507. FIG. 5H illustrates the text 504 stating "GOAL" for a goal scored in the main screen.

The soccer games illustrated in FIGS. 5A-5H are provided only as examples. Various other sporting events may be used for a VS game. Further, the configurations provided for herein may be used for various other skill-based events other than VS games.

Figure 6:
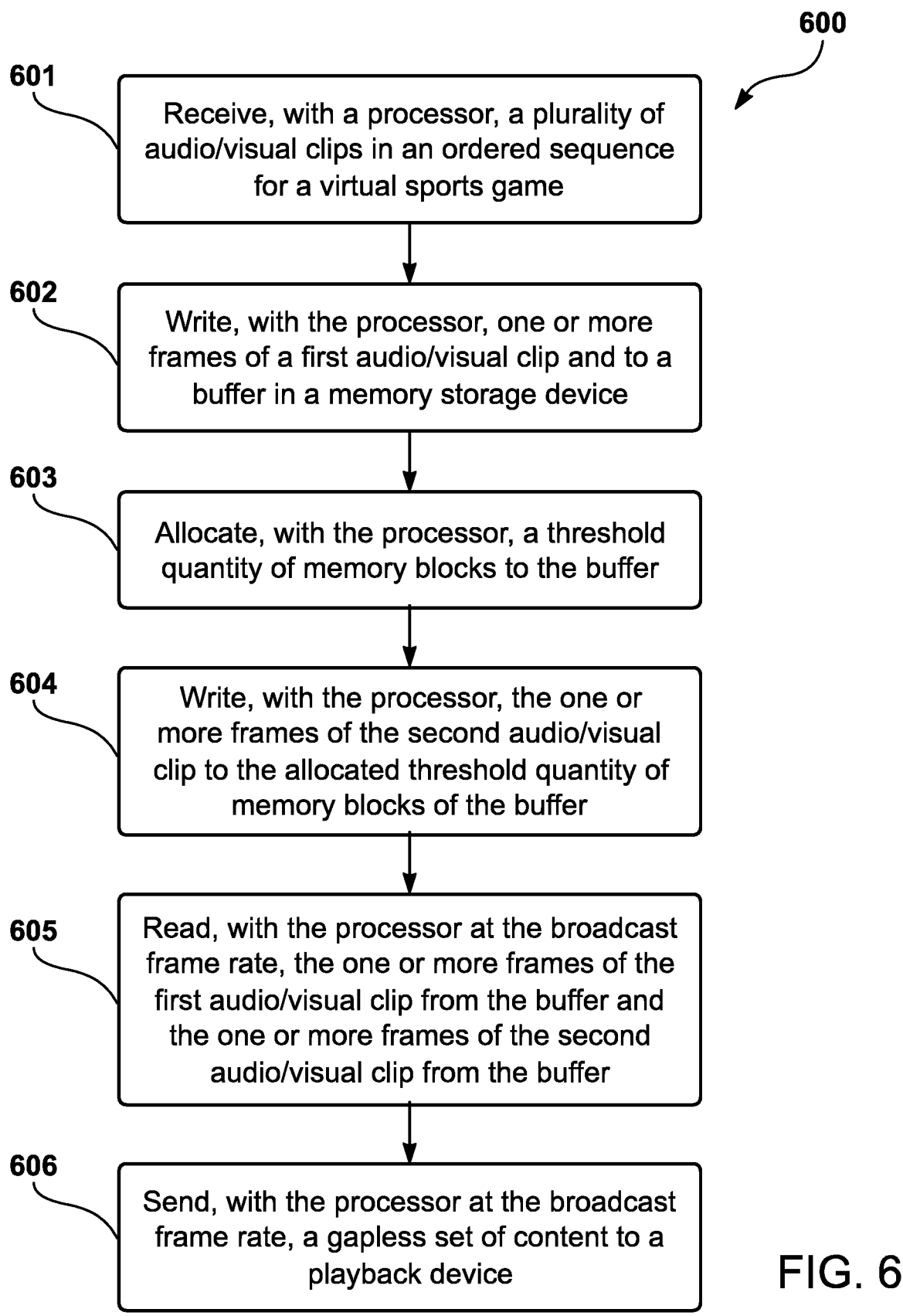
FIG. 6 illustrates a process that may be utilized to generate gapless content for a VS game.

FIG. 6 illustrates a process 600 that may be utilized to generate gapless content for a VS game. At a process block 601, the process 600 receives, with the processor 105 (FIGS. 1A and 1B), a plurality of A/V clips 301 (FIG. 3) in an ordered sequence for a VS game. Each of the plurality of A/V clips 301 corresponds to a sports-based event occurring prior to initiation of the VS game at a computing device. Further, at a process block 602, the process 600 writes, with the processor 105, one or more frames of a first A/V clip 301 to a buffer in a memory storage device 107, the one or more frames of the first A/V clip 301 being selected from the plurality of A/V clips 301.

Additionally, at a process block 603, the process 600 allocates, with the processor 105 (FIG. 1), a threshold quantity of memory blocks to the buffer. The threshold quantity of memory blocks being determined such that the processing speed of writing one or more frames of a second A/V clip 301 to the buffer is faster than a broadcast frame rate for broadcasting the first A/V clip. The broadcast frame rate is the rate (e.g., twenty five frames per second) at which content is broadcasted by a delivery mechanism (e.g., HTTP Live Streaming 210, CDN Feed 211, RTMP Streaming 212, SDI Satellite 213). The one or more frames of the second A/V clip 301 are selected from the plurality of A/V clips 301.

In one embodiment, the threshold quantity of memory blocks is based on the size (e.g., number of pixels) of the A/V clip 301. For example, one A/V clip 301 may have frames with more pixels than another A/V clip 301; thereby necessitating a larger quantity of memory blocks. In another embodiment, the threshold quantity of memory blocks is based on a time that is necessary to write data to the buffer at a rate that is faster than the broadcast frame rate. For instance, the threshold quantity of memory blocks may be configured so that the processor 105 is writing data to the buffer one second faster than the broadcast frame rate at which data is being read from the buffer. Therefore, the processor 105 may dynamically determine the threshold quantity of memory blocks based on a variety of changing variables. Alternatively, the processor 105 may utilize a predetermined threshold quantity of memory blocks instead of performing a recalculation for each A/V clip.

By adjusting the buffer based on the broadcast frame rate, the processor 105 ensures that the buffer always has enough data to be read before playback of previous frames has completed. Additionally, the buffer allows for reduced memory requirements as multiple A/V clips do not have to be simultaneously stored in the memory device 107.

At a process block 604, the process 600 writes, with the processor 105 (FIGS. 1A and 1B), the one or more frames of the second A/V clip 301 to the allocated threshold quantity of memory blocks of the buffer. Further, at a process block 605, the processor 105 reads, at the broadcast frame rate, the one or more frames of the first A/V clip from the buffer and the one or more frames of the second A/V clip from the buffer. In addition, at a process block 606, the processor 105 sends, at the broadcast frame rate, a gapless set of content to a playback device. The gapless set of content comprises the one or more video frames of the first A/V clip 301 and the one or more video frames of the second A/V clip 301.

In another embodiment, a linking configuration is used to link a plurality of video layers into a composited video frame for rendering by the virtual gaming console 101 and/or the mobile computing device 151 illustrated in FIGS. 1A and 1B, respectively. Rather than performing runtime edits on pre-recorded video clips, which may be computationally intensive, the linking configuration generates a composited video frame with the pre-recorded video clip as base layer, and one or more overlay layers linked to that base layer. As a result, the linking configuration generates video frames that may be rendered in a practical implementation of a VS game.

For example, a VS game may include a plurality of pre-recorded basketball video clips, each having corresponding displays of real game data (real game scores, real game times, etc.); yet, the probability of such game data coinciding with displays of VS game data (VS scores, VS times, etc.) is quite low. Accordingly, a practical application of the video frames of the VS game displays the VS game data, not the real game data. But the operator WMS 103 will not even know which pre-recorded video clip has been selected until rendering time because that pre-recorded video clip, and the outcome that led to the selection of the pre-recorded video clip, are not determined until runtime of the VS game, after a wager has been received by the user 102, to comply with applicable wagering regulations. As a result, modifications to a video frame would have to occur at runtime of the VS game, which would be computationally intensive and lead to significant delays in rendering the VS game, thereby being an impractical application for rendering VS games. By way of contrast, instead of modifying the pre-recorded video clip, the linking configuration links layers to the pre-recorded video clip, which acts as a base layer. The linked layers that overlay the base layer essentially include the intended modifications to the pre-recorded video clip. Accordingly, the linked video frame may be composited into a composited video frame that may be rendered in the VS game in a manner that is practical and reduces computational complexity.

Figure 7:
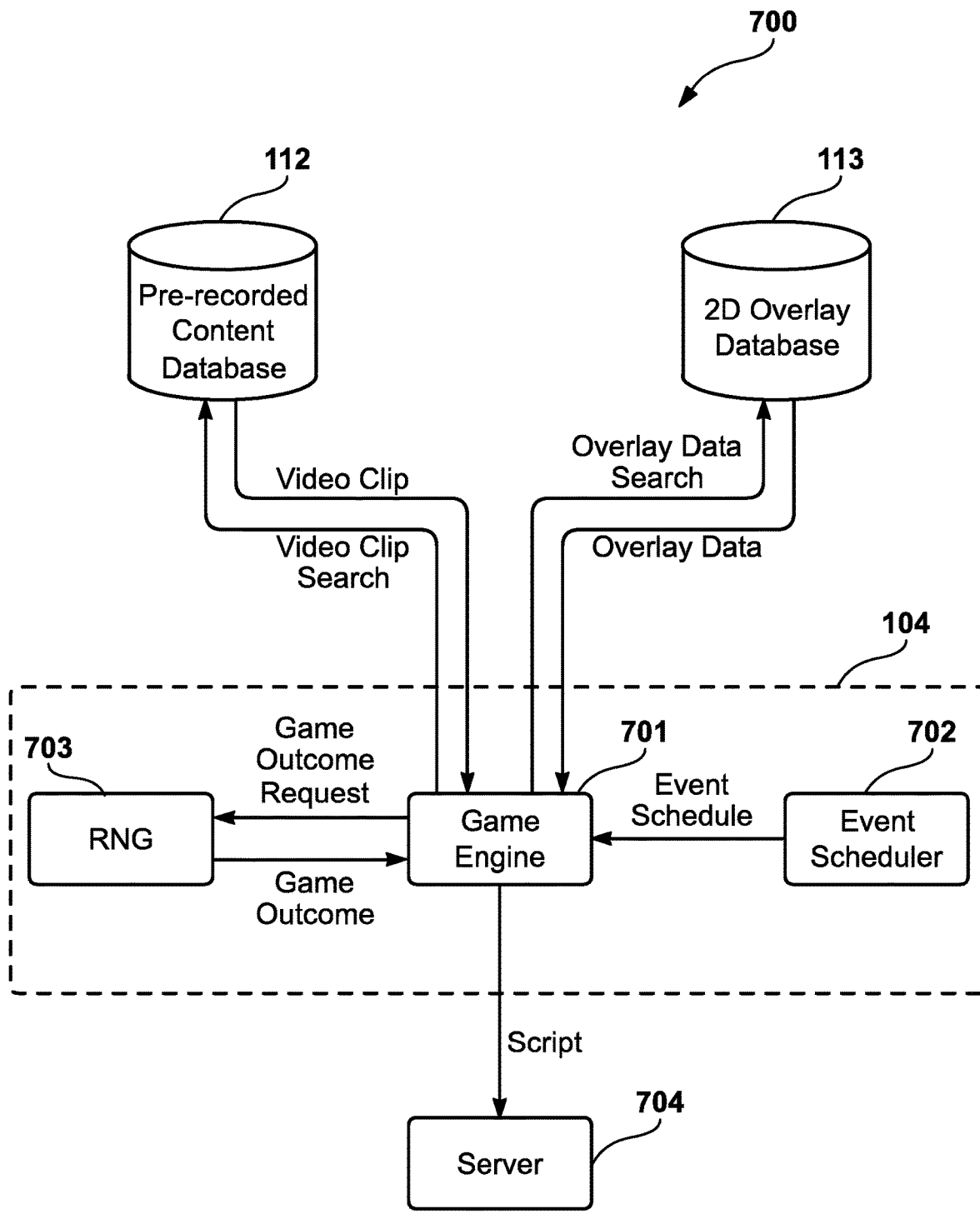
FIG. 7 illustrates a game system configuration that may be utilized to generate a script, which indicates a sequence of pre-recorded video frames to be linked with various overlay data for compositing into a composited video frame.

FIG. 7 illustrates a game system configuration 700 that may be utilized to generate a script, which indicates a sequence of pre-recorded video frames to be linked with various overlay data for compositing into a composited video frame. The virtual gaming system 104 may have a game engine 701, which may be implemented according to the game core logic code 109, illustrated in FIGS. 1A and 1B, that receives an event schedule from an event scheduler 702, which may be implemented according to the event scheduler code 110 illustrated in FIGS. 1A and 1B. (Although the event scheduler 702 is illustrated as being distinct from the game engine 701, alternatively, the event scheduler 702 may be integrated within the game engine 701.)

As an example, the event scheduler 702 may publish at midnight a daily schedule of VS games (e.g., sport, times, teams, odds of winning, etc.) for that day. For instance, the operator WMS 103 may have indicated, via one or more messages to the virtual gaming system 104, that it wants to allow VS players to play a VS game every ten minutes. As a result, the event scheduler 702 may prepare a schedule of times corresponding to the time increment indicated by the operator WMS 103. For example, the operator WMS 103 may indicate that it wants to operate a VS soccer game for a time increment of ten minutes. The game engine 701 and/or the event scheduler 702 may then select soccer teams, via random or non-random selection, for a VS game at each of the times during the day that correspond to the indicated time increment. Moreover, the event scheduler 702 may generate and publish an event schedule based on the selected soccer teams. As a result, the operator WMS 103 may display the event schedule to a potential user 102 (FIGS. 1A and 1B) so that the potential user 102 may determine a time at which a soccer team of interest to the potential user 102 is playing in the VS game. The potential user 102 may then place a wager for a VS game at a time indicated by the event schedule for an event identifier corresponding to the VS game.

In addition to publishing the event schedule, the game engine 701 and/or the event scheduler 702 may send a message, or signal, to the operator WMS 103 to stop accepting wagers. For example, at a predetermined time period (e.g., two minutes) prior to the initiation of the published VS game start time, the game engine 701 may send a message to the operator WMS 103 to stop accepting wagers from the user 102 after that predetermined time period. The foregoing message acts as a notification to the operator WMS 103 so that the operator WMS 103 stops receiving wagers from the user 102 prior to a game outcome determination by the game engine 701.

Within real-time, or substantial real-time, of the published start time for the VS game, the game engine 701 may request a game outcome from an RNG 703, or other VS game outcome determination component. (The RNG 703 may be operator-based or provided from an independent entity.) In one embodiment, the RNG 703 then randomly determines a game outcome (e.g., winning team, score, etc.) for the VS game. In another embodiment, the RNG 703 is utilized to select between different probable outcomes as generated by a VS game outcome determination component that is distinct from the RNG 703. For example, the VS game outcome determination component may determine that team A has a twenty percent chance of winning the VS game and that team B has an eighty percent chance of winning the VS game; such probabilities may be determined according to a variety of factors (e.g., real-world statistics, current events, roster changes, etc.). A mapping component may then map the probabilities determined by the VS game outcome determination component onto a numerical range (e.g., from zero to one in one-tenth increments). The RNG 703 may then randomly select a number from that numerical range. For example, if the RNG 703 selects a number less than two-tenths (correlating to twenty percent), team A wins the VS game; otherwise, team B wins the VS game. (The foregoing embodiments are not limited to actual wins of the VS game, and may be implemented with respect to VS game events (e.g., goals).)

Upon determining the VS game outcome, as generated by the RNG 703, the game engine 701 may subsequently determine pre-recorded video clips that substantially correspond (e.g., pre-recorded video clips with VS game participants published in the event schedule and associated actions) to the determined game outcome. For example, the game engine 701 may search the pre-recorded content database 112 for pre-recorded video clips corresponding to VS participants appearing in the published event schedule and corresponding to goals scored by the VS participant that is determined to win according to the RNG 703. However, the pre-recorded video clips do not have to have real-world game data that matches the VS game data (e.g., scores, times of scores, etc.) to constitute a substantial correspondence, given that the real-world game data may be effectively modified via a linked composite frame.

In one embodiment, the event schedule is particular to a particular type of VS game. For example, a daily event schedule may be restricted to just VS basketball games. By imposing such a restriction, the computing hardware corresponding to the game system configuration 700 may be dedicated to particular set of data, which may increase computing efficiency when compared with larger data sets for multiple VS games. In another embodiment, the event schedule is not restricted to a particular type of VS game.

Additionally, upon determining the VS game outcome, as generated by the RNG 703, the game engine 701 may subsequently determine overlay data corresponding to the VS game outcome. In other words, the game engine 701 determines various VS game data (scores, times, etc.) that will overlay a pre-recorded video clip to ensure that a linked composite frame displays the action in the pre-recorded video clip, but with the corresponding VS game data instead of the corresponding real-world game data. Accordingly, the game engine 701 may search the 2D overlay database 113 for such overlay data.

Finally, in one embodiment, the game engine 701 generates a script, which includes a series of commands for rendering the pre-recorded video clips in a particular sequence (e.g., at time offset zero, play pre-recorded video clip a; at time offset ten seconds, play pre-recorded video clip b, etc.). (A program, or other form of computerized code, may be used instead of a script.) In another embodiment, the script may include an overlay data identifier that identifies overlay data corresponding to the pre-recorded video clip at a particular time offset.

The game engine 701 may send the script to a server 704 (e.g., an HTTP server) that composites the linked video frames according to the script. Alternatively, the game engine 701 may perform the foregoing rather than sending the script to the server 704.

Figure 8:
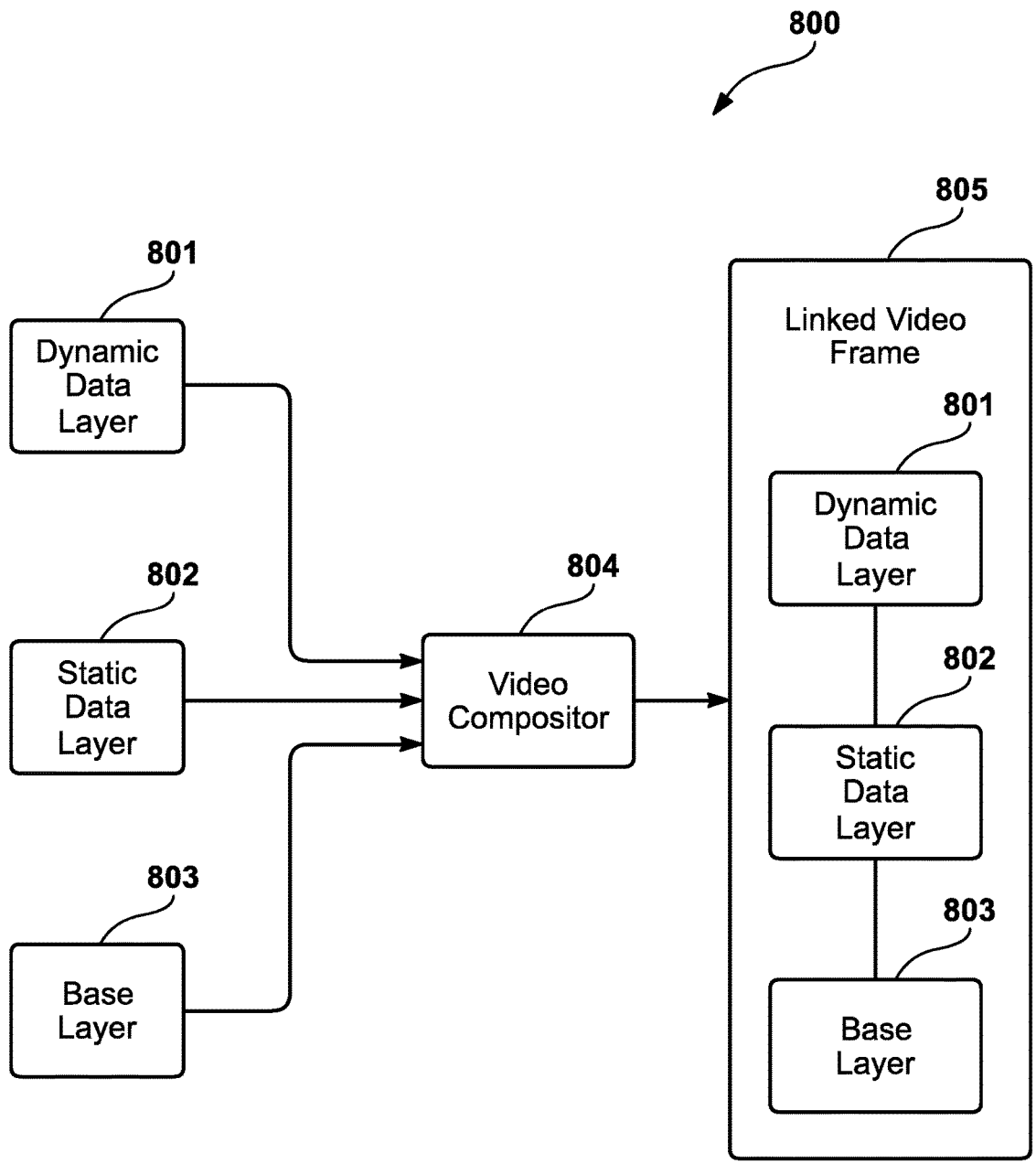
FIG. 8 illustrates a linking configuration that may be used to link a plurality of layers together as a linked video frame for rendering in a VS game.

FIG. 8 illustrates a linking configuration 800 that may be used to link a plurality layers together as a linked video frame for rendering in a VS game. For example, the server 704, illustrated in FIG. 7, may implement the script by generating a sequence of linked video frames at time offsets indicated by the script. In one embodiment, the server 704 links a plurality of different types of layers, which may have different degrees of transparency. For example, the server 704 may link one or more dynamic data layers 801 over one or more static data layers 802 over a base layer 803, according to the script. By providing for various degrees of transparency in each layer and linking the layers in a particular order, the server 704 may utilize a video compositor 804 to generate a linked video frame 805. As a result, the video compositor 804 is able to effectively edit the base layer 803 (e.g., pre-recorded video clip) with display layers that overlay portions of the base layer 803 that should not be visible during the VS game, rather than modifying the pixels of the base layer 803 itself.

As an example, the dynamic data layer 801 may include a portion corresponding to data that cannot be determined until the outcome of the VS game is determined. For instance, a VS game may be won by the user 102, illustrated in FIG. 1, and the dynamic data layer 801 may have a rotating trophy for display during a final pre-recorded video clip. Yet, the team in the real-world game corresponding to the pre-recorded video clip may not have even won the real-world game. Accordingly, the dynamic data layer 801 allows the server 704 to add data to the base layer 803 based on the outcome of the VS game, as determined by the RNG 703 illustrated in FIG. 7.

In one embodiment, the dynamic data layer 801 may be implemented via an embedded framework that embeds a web browser within a software application operated by the server 704 and/or the video compositor 804. As a result, one or more dynamically generated objects may be positioned within the data layer 801 at a portion of the dynamic data layer 801, which may be indicated by the script, that is intended for display as an overlay to the base layer 803 (e.g., pre-recorded video clip). In other words, the dynamic data layer 801 may itself not have visual data (e.g., images, animated graphics, text, etc.) located at the corresponding position prior to runtime during VS game rendering, but rather may have a command (e.g., http command) for obtaining the intended visual data and placing the visual data at the intended position in the dynamic data layer 801 during runtime.

By way of contrast, the static data layer 803 may have visual data that is positioned within it prior to runtime. For example, the server 704 may be aware of a pre-determined time duration (e.g., ten minutes) for a particular VS game given that the event schedule may be published prior to runtime of that VS game. Accordingly, each VS game may have a game clock that reflects the time duration for the VS game, not the time duration displayed in a pre-recorded video clip that corresponds to a real-world game. Therefore, the server 704 may generate, prior to runtime of the VS game, the static data layer 803 such that the game clock is located at an intended position, and indicates a particular time increment. For instance, the server 704 may pre-populate a plurality of static layers 803, each corresponding to a particular time increment (e.g., one second) of the published time duration. The clock may be positioned within the static layer 803 to overlay the clock of a corresponding pre-recorded video clip. (The example of the clock is not intended to be limiting since a variety of visual data other than a clock may be used instead in the static layer 803.)

Whether dynamically generated at runtime or pre-populated prior to runtime, a dynamic layer 801 and/or a static layer 802 in the linking configuration 800 are linked temporally to the base layer 803 so that layers may be composited by the video compositor 804 for a particular time increment. In one embodiment, the script may indicate which layers are linked to each other for a given time increment. The server 704 may then obtain files (e.g., via an application programming interface ("API")) corresponding to the various layers, or portions thereof. Further, the video compositor 804 may generate a composite of the various layers to generate the linked video frame 805 for a given time increment.

Alternatively, the video compositor 804 may generate the linked video frame 805 without a script indicating the temporal linking. For instance, each layer may be generated by the game engine 701 and/or the server 704 to have corresponding metadata that indicates a corresponding temporal linking. As an example, the static layer 802 may have metadata that indicates that a clock should be displayed at a time corresponding to the time displayed by the image of the clock.

In one embodiment, the server 704 continuously provides layers to the video compositor 804 so that an unbroken video stream may be rendered by the virtual gaming console 101 or the mobile computing device 151, illustrated in FIGS. 1A and 1B respectively. In other words, layers maybe provided to the video compositor 804 even if a VS game is not intended for rendering during a given time period (e.g., an intermission between two published VS games, as indicated by the event schedule). As an example, a base layer 803 that is promotional, or even blank, may be provided to the video compositor 804 to avoid interruptions in streaming of the VS game to the virtual gaming console 101 or the mobile computing device 151.

Figure 9A:
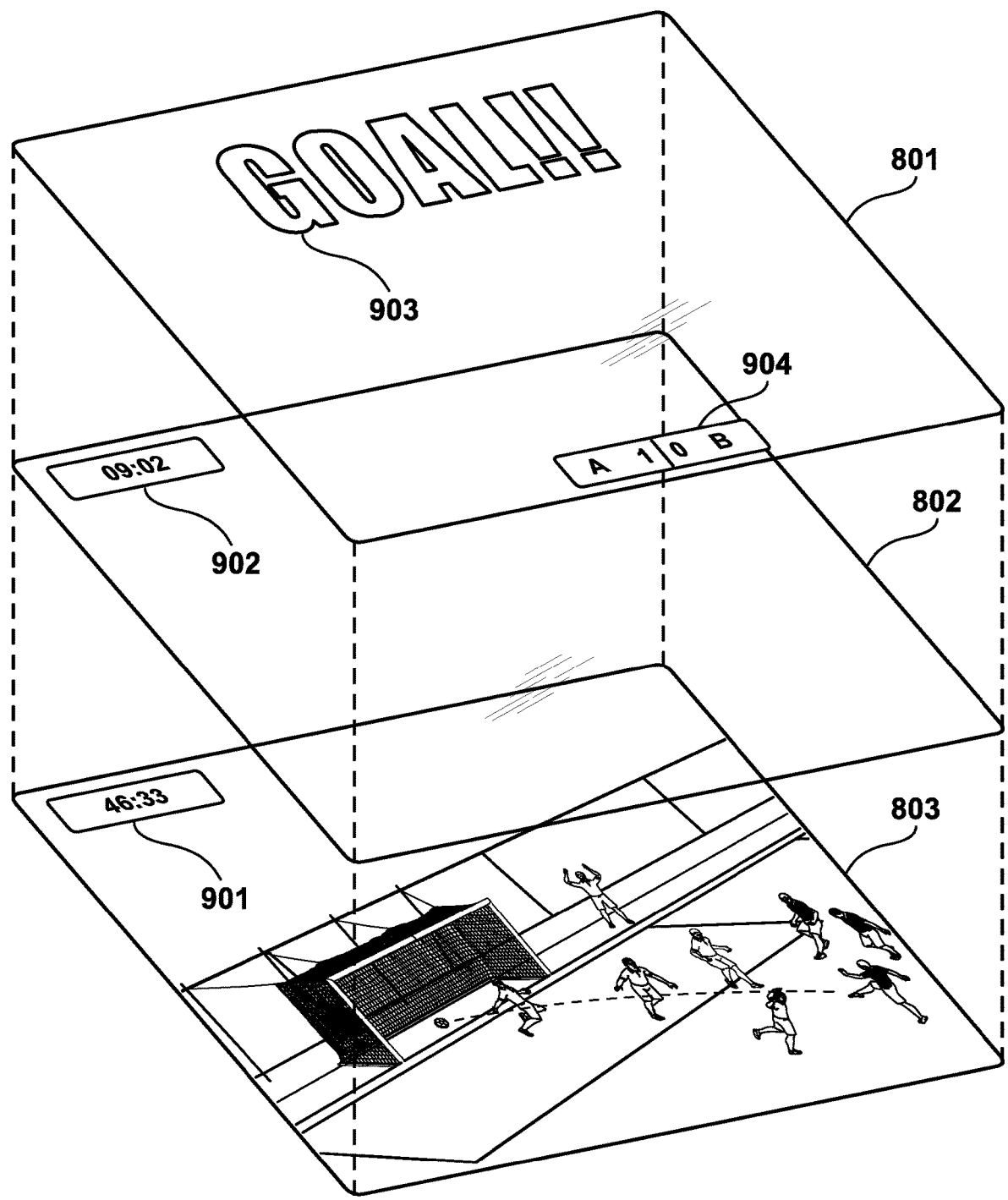
FIG. 9A illustrates a base layer, which is a pre-recorded video clip of a soccer match, being linked with various other layers that overlay data on top of the base layer.
Figure 9B:
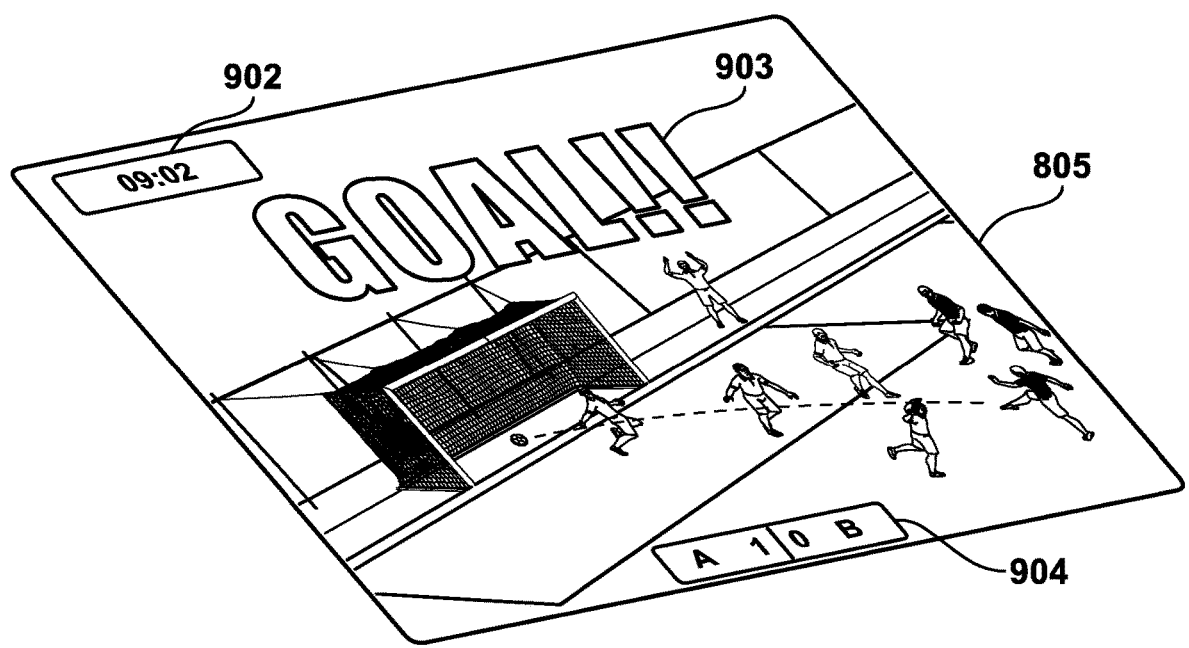
FIG. 9B illustrates the linked video frame that results from the example layers from FIG. 9A being linked together.

FIGS. 9A and 9B illustrate an example of the layers 801-803 illustrated in FIG. 8 being linked and composited. In particular, FIG. 9A illustrates a base layer 803, which is a pre-recorded video clip of a soccer match, being linked to various other layers that overlay data on top of the base layer 803. In one embodiment, a layer is a video frame (e.g., a 2D geometrical shape, such as a rectangle, having an arrangement of pixel values). Further, each of the layers 801-803 may have a corresponding alpha value (i.e., transparency value) associated with one or more portions of a respective layer 801-803. For example, the base layer 803 may have a maximum alpha value for each corresponding pixel such that the base layer 803 is fully opaque without any transparency. In contrast, the overlay layers 802 and 803 may have alpha values of zero for areas that should be transparent, and higher alpha values for corresponding portions that should overlay the base layer 803.

As an example, a pre-recorded video clip of a soccer match may be the base layer 803. In the real-world occurrence, a soccer player scored a goal at a time of forty six minutes and thirty three seconds into the soccer match is displayed on a real-world game clock image 901. From a VS game perspective, that would not be realistic if the VS game has a shorter time duration (e.g., ten minutes). Accordingly, a VS game clock image 902 (e.g., indicating a time of nine minutes and two seconds) may be positioned within the static layer 802 at a portion to overlay the real-world game clock image 901. Accordingly, the remainder of the static layer 802 may be fully, or almost fully, transparent, whereas the VS game clock image may be opaque. For instance, the static layer 802 may be a pre-recorded video clip with other content in the remainder of the static layer 802 (e.g., imagery for another soccer match) that is rendered transparent. Alternatively, the server 704, illustrated in FIG. 7, may generate a blank static layer 802 that only has the intended imagery, such as the VS game clock 902.

As another example, a VS game score indicium 904 may be positioned within the dynamic layer 801 to dynamically update the score during runtime. As yet another example, at runtime after the outcome has been determined by the RNG 703, illustrated in FIG. 7, the dynamic layer 801 obtains dynamic layer imagery 903 (e.g., a "goal" image) to be overlaid on top of the static layer 802 and the base layer 803.

Although only one dynamic layer 802 and one static layer 803 are illustrated, multiple dynamic layers 802 and/or multiple static layers 803 may be utilized during the linking. Further, multiple base layers may also be utilized.

FIG. 9B illustrates the linked video frame 805 that results from the example layers 801-803 from FIG. 9A being linked together. The transparent portions of the overly layers 801 and 802 allow for blending of the imagery from the overlay layers over the base layer 803 (e.g., pre-recorded video clip). As a result, the linking configuration 800 illustrated in FIG. 8 is able to link layers, and corresponding imagery, of frames together for compositing by the video compositor 804, thereby reducing the computational complexity of editing imagery of pre-recorded video clips during runtime (i.e., after a wager has been received for game play).

Figure 10:
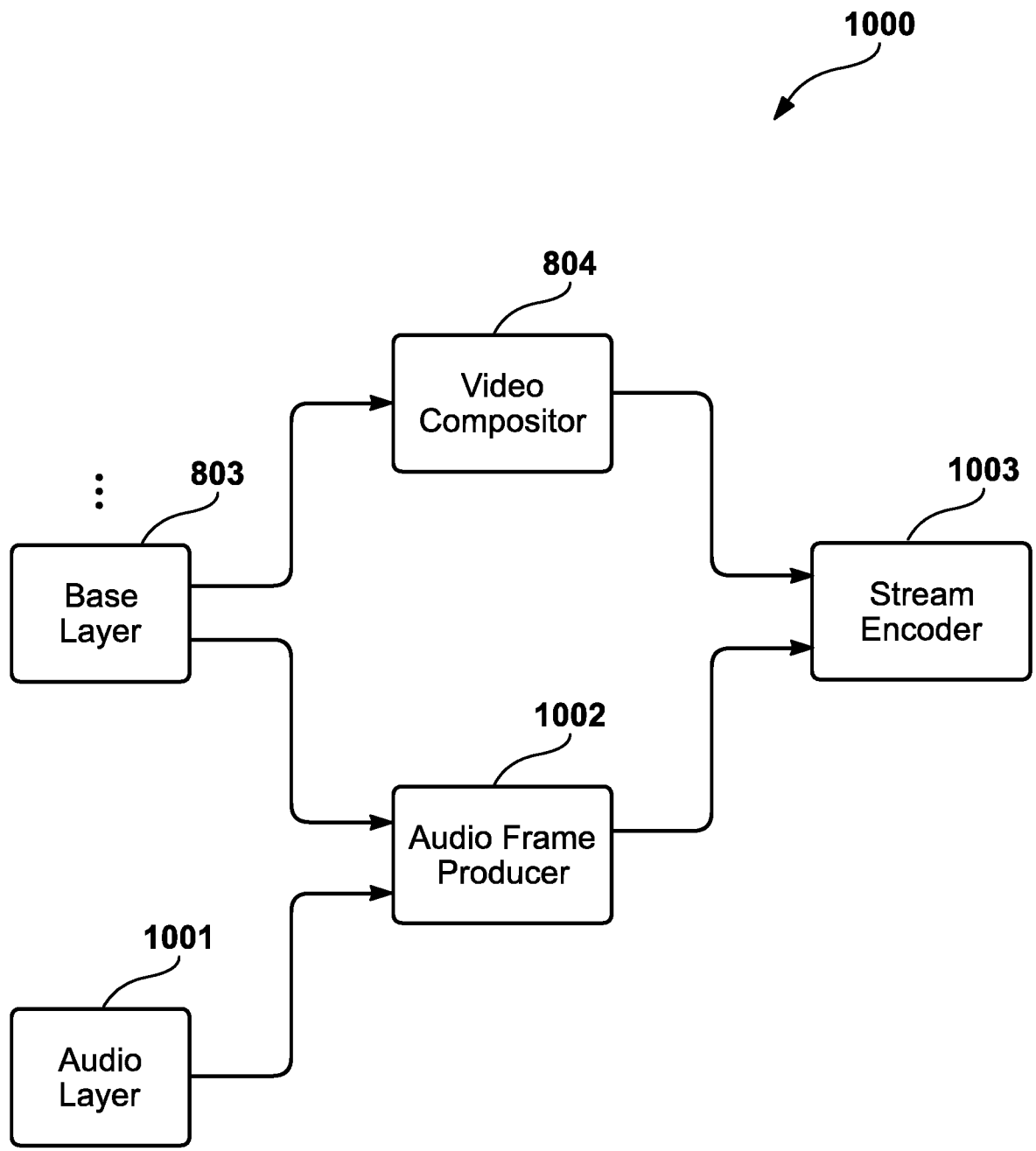
FIG. 10 illustrates a video and audio linking configuration.

Although the linking configuration 800 illustrated in FIG. 8 may be implemented based on video frames without audio, in an alternative embodiment, the linking configuration 800 may be implemented to also provide audio (e.g., audio effects corresponding to the imagery generated for display during rendering of the VS game). FIG. 10 illustrates a video and audio linking configuration 1000. In addition to the base layer 803 being provided to the video compositor 804, the base layer 803 is also provided to an audio frame producer 1002, which generates an audio frame for the time offset corresponding to the base layer 803. In one embodiment, the audio frame producer 1002 only generates an audio frame based on the audio layers 1001 corresponding to the base layer 803. In another embodiment, the audio frame producer 1002 generates the audio frame based on the audio layers 1001 corresponding to a dynamic layer 801 and/or a static layer 802. For example, an audio layer 1001 may correspond to particular imagery displayed in one of the layers, such as an audio effect for "GOAL" corresponding to the time offset for the associated imagery from one of the imagery layers 801-803.

Upon the video compositor 804 generating the linked video frame 805, illustrated in FIG. 8, and the audio mixer 1002 generating a corresponding audio frame, a stream encoder 1003 may encode the linked video frame 805 and a corresponding audio frame together for distribution in an A/V stream, such as an http live stream ("HLS"). (The stream encoder 1003 is not limited to use with both video and audio—it can be utilized with the linking configuration 800 illustrated in FIG. 8 without audio.)

Additional componentry may also be utilized to generate analytics. For example, video and audio splitters may be used to isolate video and/or audio for storage (e.g., via a recorder) and subsequent analysis.

Figure 11:
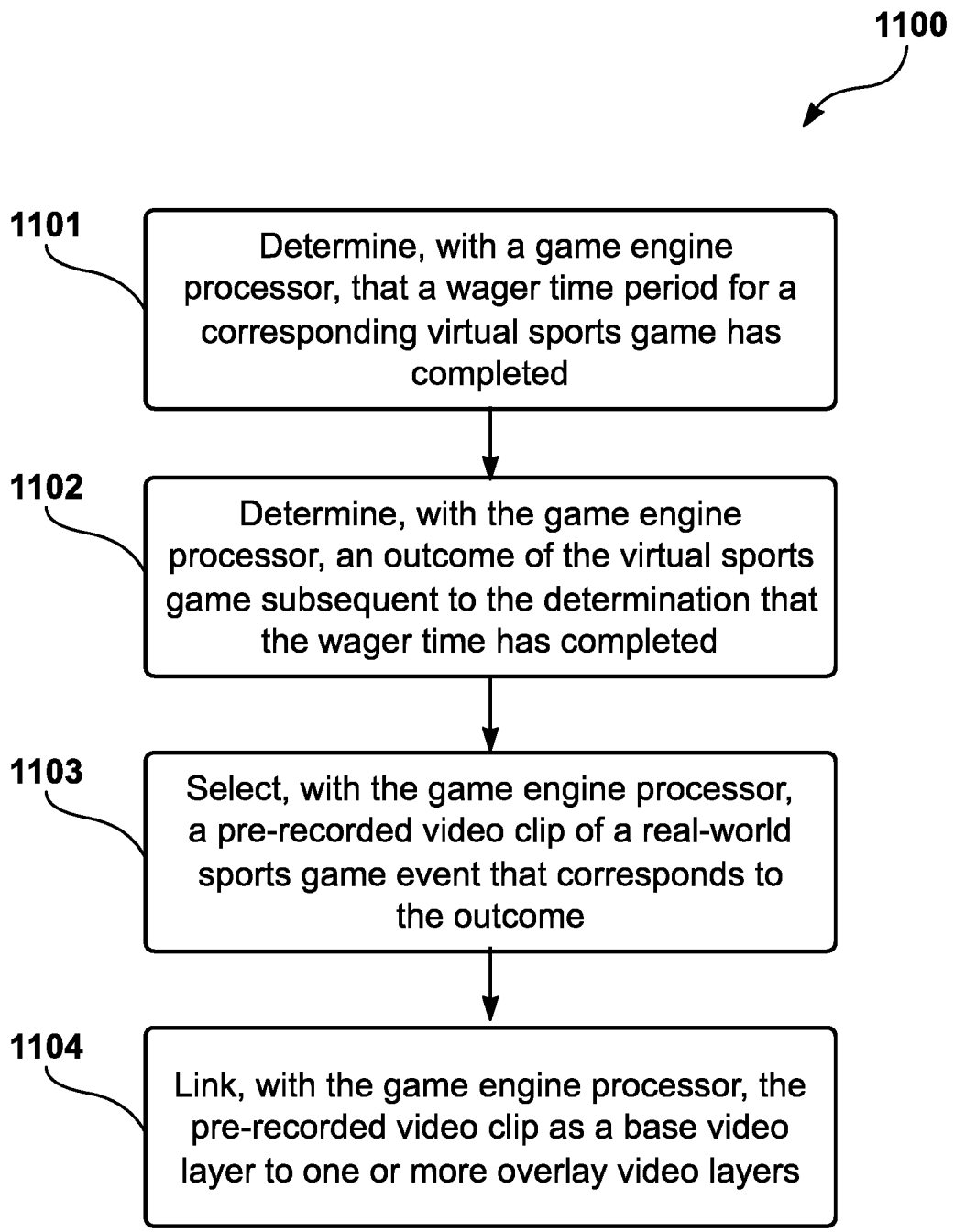
FIG. 11 illustrates a process that may be utilized to link the layers illustrated in FIG. 8 into the linked video frame for rendering during the VS game at the virtual game console or the mobile computing device illustrated in FIGS. 1A and 1B, respectively.

FIG. 11 illustrates a process 1100 that may be utilized to link the layers 801-803 illustrated in FIG. 8 into the linked video frame 805 for rendering during the VS game at the virtual game console 101 or the mobile computing device 151 illustrated in FIGS. 1A and 1B, respectively. At a process block 1101, the process 1100 determines, with a game engine processor, that a wager time period for a corresponding virtual sports game has completed. The wager time period is a period of time in which one or more user inputs are permitted to be received at a computing device (e.g., virtual game console 101 or mobile computing device 151) that renders the VS game. The processor 105 illustrated in FIGS. 1A and 1B may a specialized processor (e.g., a graphical processing unit ("GPU")) that is used to practically implement the game engine 701 illustrated in FIG. 7 via high resolution graphics for the pre-recorded video clips of the VS games.

Further, at a process block 1102, the process 1100 determines, with the game engine processor, an outcome of the VS game subsequent to the determination that the wager time period has completed. Additionally, at a process block 1103, the process 1100 selects, with the game engine processor, a pre-recorded video clip of a real-world sports game event that corresponds to the outcome. Moreover, at a process block 1104, the process 1100 links, with the game engine processor, the pre-recorded video clip as a base video layer to one or more overlay video layers. The one or more overlay video layers have one or more images that correspond to one or more VS game criteria. The one or more virtual sports game criteria differ from video content corresponding to the real-world sports game event.

A computer is herein intended to include any device that has a specialized purpose processor as described above. For example, a computer may be a PC, laptop computer, set top box, cell phone, smartphone, tablet device, smart wearable device, portable media player, video player, etc.

It is understood that the apparatuses described herein may also be applied in other types of apparatuses. Those skilled in the art will appreciate that the various adaptations and modifications of the embodiments of the apparatuses described herein may be configured without departing from the scope and spirit of the present computer apparatuses. Therefore, it is to be understood that, within the scope of the appended claims, the present apparatuses may be practiced other than as specifically described herein.

We claim:

1. A computer program product comprising a computer readable storage device having a computer readable program stored thereon, wherein the computer readable program when executed on a computer causes the computer to:
   determine, with a game engine processor, that a wager time period for a corresponding virtual sports game has completed, the wager time period being a period of time in which one or more user inputs are permitted to be received at a computing device that renders the virtual sports game;
   determine, with the game engine processor, an outcome of the virtual sports game subsequent to the determination that the wager time period has completed;
   select, with the game engine processor, a pre-recorded video clip of a real-world sports game event that corresponds to the outcome; and
   link, with the game engine processor, the pre-recorded video clip as a base video layer to one or more overlay video layers, the one or more overlay video layers having one or more images that correspond to one or more virtual sports game criteria, the one or more virtual sports game criteria differing from video content corresponding to the real-world sports game event.

2. The computer program product of claim 1, wherein the computer is further caused to generate, with the game engine processor, a script that composites the base video layer and the one or more overlay video layers into a linked video frame.

3. The computer program product of claim 2, wherein the linked video frame is composited without editing the base video layer.

4. The computer program product of claim 1, wherein the linked video frame is transmitted to the computing device for rendering the virtual sports game.

5. The computer program product of claim 1, wherein the one or more overlay video layers are transparent other than at positions corresponding to the one or more images.

6. The computer program product of claim 1, wherein the one or more overlay video layers include a dynamic overlay video layer in which the game engine processor determines the one or more images subsequent to the determination of the outcome.

7. The computer program product of claim 1, wherein the one or more overlay video layers include a static overlay video layer in which the game engine processor determines the one or more images subsequent to the determination of the outcome.

8. The computer program product of claim 1, wherein the one or more virtual sports game criteria correspond to imagery associated with a time in the virtual sports game.

9. The computer program product of claim 1, wherein the one or more virtual sports game criteria correspond to imagery associated with a score in the virtual sports game.

10. The computer program product of claim 1, wherein the outcome is determined via random generation.

11. A system comprising:
    a database that stores a plurality of pre-recorded video clips of real-world sports game events; and
    a game engine processor that determines that a wager time period for a corresponding virtual sports game has completed, determines an outcome of the virtual sports game subsequent to the determination that the wager time period has completed, selects a pre-recoded clip from the plurality of pre-recorded clips that corresponds to the outcome, and links the pre-recorded video clips as a base video layer to one or more overlay video layers, the wager time period being a period of time in which one or more user inputs are permitted to be received at a computing device that renders the virtual sports game, the one or more overlay video layers having one or more images that correspond to one or more virtual sports game criteria, the one or more virtual sports game criteria differing from video content corresponding to the real-world sports game event.

12. The system of claim 11, wherein the game engine processor generates a script that composites the base video layer and the one or more overlay video layers into a linked video frame.

13. The system of claim 12, wherein the linked video frame is composited without editing the base video layer.

14. The system of claim 11, wherein the linked video frame is transmitted to the computing device for rendering the virtual sports game.

15. The system of claim 11, wherein the one or more overlay video layers are transparent other than at positions corresponding to the one or more images.

16. The system of claim 11, wherein the one or more overlay video layers include a dynamic overlay video layer in which the game engine processor determines the one or more images subsequent to the determination of the outcome.

17. The system of claim 11, wherein the one or more overlay video layers include a static overlay video layer in which the game engine processor determines the one or more images subsequent to the determination of the outcome.

18. The system of claim 11, wherein the one or more virtual sports game criteria correspond to imagery associated with a time in the virtual sports game.

19. The system of claim 11, wherein the one or more virtual sports game criteria correspond to imagery associated with a score in the virtual sports game.

20. A method comprising:
    determining, with a game engine processor, that a wager time period for a corresponding virtual sports game has completed, the wager time period being a period of time in which one or more user inputs are permitted to be received at a computing device that renders the virtual sports game;
    determining, with the game engine processor, an outcome of the virtual sports game subsequent to the determination that the wager time period has completed;
    selecting, with the game engine processor, a pre-recorded video clip of a real-world sports game event that corresponds to the outcome; and
    linking, with the game engine processor, the pre-recorded video clip as a base video layer to one or more overlay video layers, the one or more overlay video layers having one or more images that correspond to one or more virtual sports game criteria, the one or more virtual sports game criteria differing from video content corresponding to the real-world sports game event.

\* \* \* \* \*